US011330311B2

(12) United States Patent
Tsukagoshi

(10) Patent No.: US 11,330,311 B2
(45) Date of Patent: May 10, 2022

(54) TRANSMISSION DEVICE, TRANSMISSION METHOD, RECEIVING DEVICE, AND RECEIVING METHOD FOR RENDERING A MULTI-IMAGE-ARRANGEMENT DISTRIBUTION SERVICE

(71) Applicant: SATURN LICENSING LLC, New York, NY (US)

(72) Inventor: Ikuo Tsukagoshi, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 16/883,898

(22) Filed: May 26, 2020

(65) Prior Publication Data

US 2020/0288182 A1    Sep. 10, 2020

Related U.S. Application Data

(62) Division of application No. 14/900,262, filed as application No. PCT/JP2014/065952 on Jun. 16, 2014, now abandoned.

(51) Int. Cl.
*H04N 21/235*    (2011.01)
*H04N 21/2365*    (2011.01)
(Continued)

(52) U.S. Cl.
CPC ....... *H04N 21/235* (2013.01); *H04N 21/2353* (2013.01); *H04N 21/2365* (2013.01);
(Continued)

(58) Field of Classification Search
None
See application file for complete search history.

(56) References Cited

U.S. PATENT DOCUMENTS 6,314,569 B1    11/2001    Chernock
7,174,512 B2    2/2007    Martin
(Continued)

FOREIGN PATENT DOCUMENTS

JP    2000-013712    1/2000
JP    2003-199009    7/2003
(Continued)

OTHER PUBLICATIONS

Extended European Search Report dated Jan. 12, 2017 in Patent Application No. 14819477.2.
(Continued)

*Primary Examiner* — Jefferey F Harold
*Assistant Examiner* — Charles N Hicks
(74) *Attorney, Agent, or Firm* — Jeffery J Brosemer

(57) ABSTRACT

Aspects of the disclosure include a receiving device that includes a receiving unit, a decoder, and a processing unit. The receiving unit receives a predetermined number of video streams containing encoded image data of a plurality of images of a multi-image-arrangement distribution service, position information being inserted in the predetermined number of video streams, and the position information showing arrangement positions of the plurality of images. The decoder unit decodes the predetermined number of video streams, and obtains image data of the plurality of images. The processing unit arranges image data of the plurality of decoded images based on the position information, and obtains image data of a multi-image-arranged image.

21 Claims, 36 Drawing Sheets

(51) Int. Cl.
  *H04N 21/431* (2011.01)
  *H04N 21/854* (2011.01)

(52) U.S. Cl.
  CPC ....... *H04N 21/4314* (2013.01); *H04N 21/854* (2013.01); *H04N 21/85406* (2013.01)

(56) References Cited

U.S. PATENT DOCUMENTS

| | | |
|---|---|---|
| 2006/0031917 A1 | 2/2006 | Winder |
| 2006/0083301 A1 | 4/2006 | Nishio et al. |
| 2007/0021055 A1 | 1/2007 | Arseneau |
| 2009/0089535 A1 | 4/2009 | Lohmar |
| 2009/0158337 A1* | 6/2009 | Stiers .................. H04N 21/235 725/44 |
| 2012/0317598 A1 | 12/2012 | Gilson |
| 2013/0170561 A1 | 7/2013 | Hannuksela |
| 2013/0235270 A1 | 9/2013 | Sasaki et al. |
| 2014/0109166 A1 | 4/2014 | Koreeda |
| 2014/0140415 A1* | 5/2014 | Choe ..................... H04N 19/59 375/240.25 |
| 2015/0208095 A1* | 7/2015 | Schierl ................. H04N 19/174 375/240.28 |
| 2016/0046635 A1 | 2/2016 | Dax et al. |

FOREIGN PATENT DOCUMENTS

| | | |
|---|---|---|
| JP | 2013-048442 | 3/2013 |
| RU | 2009 141 712 A | 11/2009 |
| WO | 2012/093714 | 7/2012 |
| WO | WO 2012/168365 A1 | 12/2012 |
| WO | WO 2013/021656 A1 | 2/2013 |

OTHER PUBLICATIONS

Emmanuel Thomas et al: "Spatially Segmented Content Description", International Organisation for Standardisation. ISO/IEC JTC1/SC29/WG 11. Coding Of Moving Pictures And Audio. ISO/IEC JTC1/SC29/WG11 MPEG2013/m28883, XP030057416, Apr. 12, 2013, 12 pages.

Anthony Vetro et al: "Overview of the Stereo and Multiview Video Coding Extensions of the H.264/MPEG-4 AVC Standard", Proceedings of the IEEE, vol. 99, No. 4, XP055132298, Apr. 1, 2011, pp. 626-642.

Jean-Claude Dufourd, "LASeR: The Lightweight Rich Media Representation Standard [Standards in a Nutshell]", IEEE Signal Processing Magazine, vol. 25, No. 6, XP011236249, Nov. 1, 2008, pp. 164-168.

Russian Office Action dated Oct. 2, 2017 in Russian Application No. 2015156234 (PCT/JP2014/065952) with English translation, 10 pages.

European Office Action dated Jan. 3, 2018 in EP Application No. 14 819 477.2-1905, 7 pages.

Kokes et al.; "Insertions and overlays for H.264/AVC"; 18.JVT Meeting; 75. MPEG Meeting; Jan. 14, 2006-Jan. 20, 2006; Bangkok, TH; (Joint Video Team of ISO/IEC JTC1/SC29/WG11 and ITU-T SG.16); No. JVT-R076, Jan. 11, 2006 (Jan. 11, 2006), XP030006343, 9 pages.

\* cited by examiner

Picture rendering type (= 011)
   Example of horizontal/vertical
   two-dimensional multi-image arrangement

| 00 00 | 00 01 | 01 00 | 01 01 |
|-------|-------|-------|-------|
| 00 10 | 00 11 | 01 10 | 01 11 |
| 10 00 | 10 01 | 11 00 | 11 01 |
| 10 10 | 10 11 | 11 10 | 11 11 |

Virtual Display

FIG.2

Picture rendering type (= 001)
   Example of horizontal
   two-dimensional multi-image arrangement

| 11 10 | 11 11 | 00 00 | 00 01 | 00 10 |
|-------|-------|-------|-------|-------|

Virtual Display

FIG.3

Group_picture_tag_SEI_syntax

| Syntax | No. of Bits | Format |
|---|---|---|
| Group_picture_tag_SEI(){ | | |
| group_picture_id | 8 | bslbf |
| picture_rendering_type | 3 | bslbf |
| lifetime_controled | 1 | bslbf |
| location_id | 4 | bslbf |
| version_number | 8 | bslbf |
| number_of_pictures | 4 | uimsbf |
| reserved | 7 | 0x7f |
| display_coordinate | 3 | uimsbf |
| group_picture_start | 1 | uimsbf |
| group_picture_end | 1 | uimsbf |
| PTD | 8 | uimsbf |
| } | | |

FIG. 14

Group_picture_tag SEI semantics

Group_picture_id (8bits) Association information for assembled display including plurality of pictures including still images
Picture rendering type (3bits) Shows arrangement type of pictures in group picture
    001    Horizontal one-dimensional multi-image arrangement
    010    Vertical one-dimensional multi-image arrangement
    011    Horizontal/vertical two-dimensional multi-image arrangement
    others    reserved
Lifetime controlled (1bit) Shows if display-allowed time is restricted or not
    1    Display-allowed time is restricted
          Display is allowed by NTP time determined based on system layer
    0    Display-allowed time is not restricted (display is allowed for indefinite period)
Location ID (4bits) Shows spatial arrangement positions of images in group picture
Version number (8bits) Ascending value showing update of images
number_of_pictures (4bits) Maximum number of simultaneously-displayed pictures having same group picture ID
    Maximum number is obtained by adding +1 to values 0000 to 1111
Group picture start (1bit) Shows start of Group picture to be updated and displayed at certain point of time
Group picture end (1bit) Shows end of Group picture to be updated and displayed at certain point of time
display_coordinate (3bits) Shows rotation type during display
    000    no rotation
    010    Clockwise 90-degree rotation display of each image
    011    Anticlockwise 90-degree rotation display of each image
    110    Clockwise 90-degree rotation display of whole Group picture
    111    Anticlockwise 90-degree rotation display of whole Group picture
    others    reserved
PTD (Presentation Time Distance) (8bits) Offset value, which is used to simultaneously display pictures in Group picture.
Display timing of picture(i) CTP = PTS(i) + (PTD(max) − PTD(i)) * System clock accuracy (90kHz)
PTD(max) is PTD of picture having latest display timing out of pictures having same Group picture ID
between group picture start and group picture end

FIG.15 multi_stream_service_descriptor syntax

| Syntax | No. of Bits | Format |
|---|---|---|
| multi_stream_service_descriptor( ) { | | |
| multi_stream_service_descriptor_tag | 8 | uimsbf |
| multi_stream_service_descriptor_length | 8 | uimsbf |
| multiple_stream_service_flag | 1 | bslbf |
| moving_picture_still_picture_mixed_service | 1 | bslbf |
| reserved | 2 | '11' |
| number_of_streams | 4 | bslbf |
| } | | |

FIG.19 multi_stream_service_descriptor semantics multiple_stream_service_flag (1bit) Flag showing multiple-distribution service
  1  Multiple-distribution service
  0  Non-multiple-distribution service
Moving_picture_still_picture_mixed_service (1bit) Flag showing still/moving-image mixed service
  1  Still/moving-image mixed service
  0  Unmixed service
number_of_streams (4bits) Total number of streams relating to multiple-distribution service
  0000  reserved
  0001  1 stream
  :
  1111  15 streams

FIG.20 mixed_stream_descriptor syntax

| Syntax | No. of Bits | Format |
|---|---|---|
| mixed_stream_descriptor () { | | |
| mixed_stream_descriptor_tag | 8 | uimsbf |
| mixed_stream_descriptor_length | 8 | uimsbf |
| service_stream_type | 2 | bslbf |
| reserved | 6 | '111111' |
| } | | |

(a)

mixed_stream_descriptor semantics

| service_stream_type (2bits) Shows stream type |
|---|
| 00    reserved |
| 01    Moving-image stream |
| 10    Still-image stream |
| 11    Still/moving-image mixed stream |

Picture_lifetime_descriptor syntax

| Syntax | No. of Bits | Format |
|---|---|---|
| Picture_lifetime_descriptor ( ) { | | |
| Picture_lifetime_descriptor tag | 8 | uimsbf |
| Picture_lifetime_descriptor length | 8 | uimsbf |
| number_of_group_pictures, N | 16 | bslbf |
| for (n = 0; n< N; n++){ | | |
| NTP(n) | 64 | uimsbf |
| } | | |
| } | | |

(a)

Picture_lifetime_descriptor semantics number_of_group_pictures (16bits)  Shows number of Group Pictures
NTP(n) (64bits)                     Clock value determined by Network Time Protocol (b)

FIG.22

Description example of DASH MPD

```
<MPD
  xmlns:xsi="http://www.w3.org/2001/XMLSchema-instance"
  xmlns="urn:mpeg:DASH:schema:MPD:2011"
  xsi:schemaLocation="urn:mpeg:DASH:schema:MPD:2011 DASH-MPD.xsd"
  type="static"
  mediaPresentationDuration="PT3256S"
  minBufferTime="PT1.2S"
  profiles="urn:mpeg:dash:profile:isoff-on-demand:2011">
  <BaseURL>http://cdn1.example.com/</BaseURL>
  <BaseURL>http://cdn2.example.com/</BaseURL>
  <BaseURL>http://cdn3.example.com/</BaseURL>
  <BaseURL>http://cdn4.example.com/</BaseURL>
  <!-- In this Period the HEVC stream is split into four representations -->
  <Period>
    <AdaptationSet
      subsegmentAlignment="true"
      subsegmentStartsWithSAP="2"
      parallelStreams="4"        // To read four streams constantly
      Bandwidth="5120000"
      width="1920"
      height="1080"
      frameRate="0"              // (Still image)
      lang="en">
      <!-- Independent Representation -->
```

TRANSMISSION DEVICE, TRANSMISSION METHOD, RECEIVING DEVICE, AND RECEIVING METHOD FOR RENDERING A MULTI-IMAGE-ARRANGEMENT DISTRIBUTION SERVICE

This present application is a Divisional Application of U.S. patent application Ser. No. 14/900,262 filed on Dec. 21, 2015, which is a National Stage Application of PCT/JP2014/065952 filed on Jun. 16, 2014, which claims the benefit of priority of Japan Patent Application No. JP2013-142179 filed on Jul. 5, 2013. The entire disclosures of the prior applications are hereby incorporated by reference in their entirety.

TECHNICAL FIELD

The present technology relates to a transmission device, a transmission method, a receiving device, and a receiving method, and specifically relates to a transmission device and the like that provides a multi-image-arrangement distribution service.

BACKGROUND ART

Technologies of multi-window display, in which a plurality of streams via broadcasting or via a network are multi-decoded and the plurality of multi-decoded images are displayed on one display, is realized or proposed.

For example, when a plurality of images are displayed in the so-called PinP (Picture in Picture) style, a user can watch the image of a program of one channel displayed on a large main-window and the image of a program of another channel displayed on a small sub-window at the same time. Further, for example, when the images of programs of different channels are displayed on the right-half and the left-half of a display side-by-side, a user can watch the images of the programs of two channels simultaneously.

For example, Patent Document 1 discloses a technology in which, when a multi-window-display instruction is input under a normal-display status, the display status is promptly switched to multi-window display.

Patent Document 1: Japanese Patent Application Laid-open No. 2000-13712

SUMMARY OF INVENTION

Problem to be Solved by the Invention

For example, a transmitting side may transmit image data of a plurality of images of a multi-image arrangement, and a receiving side may process the data of the plurality of images, obtain a multi-image-arranged image, and display the multi-image-arranged image. In this case, the receiving side needs to arrange the plurality of images appropriately.

It is an object of the present technology to successfully provide a multi-image-arrangement distribution service.

Means for Solving the Problem

According to a concept of the present technology, there is provided a transmission device, including:

a transmitting unit that transmits a container of a predetermined format containing a predetermined number of video streams containing encoded image data of a plurality of images of a multi-image-arrangement distribution service; and an information-inserting unit that inserts position information in the video-stream layer, the position information showing arrangement positions of the plurality of images.

According to the present technology, a transmitting unit transmits a container of a predetermined format containing a predetermined number of video streams containing encoded image data of a plurality of images of a multi-image-arrangement distribution service. For example, the container may be a transport stream (MPEG-2 TS) used as a digital broadcast standard. Alternatively, for example, the container may be a container having another format such as MMT or MP4 used for distribution via the Internet. An information-inserting unit inserts position information in the video-stream layer, the position information showing arrangement positions of the plurality of images.

As described above, according to the present technology, position information is inserted in the video-stream layer, the position information showing arrangement positions of the plurality of images. So the receiving side is capable of arranging the plurality of images appropriately and easily.

Note that according to the present technology, for example, the information-inserting unit may further insert offset information in the video-stream layer, the offset information being used to adjust display timing of the plurality of images. Therefore the receiving side is capable of adjusting display timing of the plurality of images in a multi-image-arranged image, and matching display-start timing of the plurality of images.

Further, according to the present technology, for example, the information-inserting unit may further insert type information in the video-stream layer, the type information showing the multi-image-arrangement type. Therefore the receiving side is capable of recognizing a multi-image-arrangement type appropriately, and arranging the plurality of images appropriately and easily. Further, according to the present technology, for example, the information-inserting unit may further insert lifetime information in the video-stream layer, the lifetime information showing display-allowed time of the plurality of images is controlled or not. Thanks to this information, for example, the receiving side is capable of automatically controlling deletion of image data stored in a virtual display buffer.

Further, according to the present technology, for example, the information-inserting unit may further insert type information in the video-stream layer, the type information showing a rotation type of the plurality of images during display. Therefore it is possible to display a plurality of images in the rotation status that the service side wants to provide.

Further, according to the present technology, for example, the information-inserting unit may further insert identification information in the container layer, the identification information identifying the multi-image-arrangement distribution service. Therefore the receiving side is capable of easily recognizing the multi-image-arrangement distribution service, and preparing for that processing. In this case, for example, the information-inserting unit may further insert identification information in the container layer, the identification information identifying if the multi-image-arrangement distribution service is a moving/still-image mixed service or not.

Further, according to the present technology, for example, the information-inserting unit may further insert information on a total number of the video streams relating to the multi-image-arrangement distribution service in the container layer. Therefore the receiving side is capable of knowing the total number of the video streams to be processed easily, and processing them appropriately.

Further, according to the present technology, for example, the information-inserting unit may further insert type information in the container layer, the type information showing if the each video stream is a moving-image stream, a still-image stream, or a mixed stream, the mixed stream containing still images and moving images mixed. Therefore the receiving side is capable of knowing the total number of the video streams to be processed easily, and processing them appropriately.

Further, according to a concept of the present technology, there is provided a receiving device, including:

a receiving unit that receives a predetermined number of video streams containing encoded image data of a plurality of images of a multi-image-arrangement distribution service, position information being inserted in the predetermined number of video streams, the position information showing arrangement positions of the plurality of images;

a decoder unit that decodes the predetermined number of video streams, and obtains image data of the plurality of images; and a processing unit that arranges image data of the plurality of decoded images based on the position information, and obtains image data of a multi-image-arranged image.

According to the present technology, a receiving unit receives a predetermined number of video streams containing encoded image data of a plurality of images of a multi-image-arrangement distribution service, position information being inserted in the predetermined number of video streams, the position information showing arrangement positions of the plurality of images. A decoder unit decodes the predetermined number of video streams, and obtains image data of the plurality of images.

Further, a processing unit arranges image data of the plurality of decoded images based on the position information, and obtains image data of a multi-image-arranged image. For example, the receiving device may further include: a decoded buffer that temporarily stores the image data of the plurality of images obtained by the decoder unit; and a virtual display buffer that temporarily stores the image data of the multi-image arrangement, in which the processing unit may read the image data of the plurality of images from the decoded buffer in series, and write the image data of the plurality of images in areas corresponding to the arrangement positions of the position information of the virtual display buffer.

As described above, according to the present technology, image data of a plurality of decoded images is arranged based on position information, and image data of a multi-image-arranged image is obtained. Therefore it is possible to obtain image data of a multi-image-arranged image effectively and appropriately.

Note that according to the present technology, for example, the receiving device may further include a display controller that reads image data corresponding to pan or all of display areas of the multi-image-arranged image firm the virtual display buffer, and displays images in the pan or all of image areas. In this case, for example, the receiving device may further include a user operation unit that informs the display controller of the display area. Therefore, for example, it is possible to change images displayed on a display, and to display a large multi-image-arranged image to be scrolled based on user-operation, for example, on a display small in size (resolution). Further, in this case, for example, the receiving device may further include a user operation unit that informs the display controller of the number of displays, images of the display area being to be displayed on the displays.

Further, according to the present technology, for example, the receiving device may further include a request transmitting unit that transmits, to a transmitting side, requests to stop and resume transmission of the predetermined number of video streams. Therefore, for example, a user can watch a multi-image-arranged image containing still images at arbitrary timing without overflowing a buffer in which image data is temporarily stored.

Further, according to another concept of the present technology, there is provided a transmission device, including:

a metafile generator that generates a metafile containing information to be used by a client terminal to obtain a predetermined number of video streams, the predetermined number of video streams containing encoded image data of a plurality of images of a multi-image-arrangement distribution service, a distribution server being capable of distributing the multi-image-arrangement distribution service via a network; and a metafile transmitting unit that transmits the generated metafile to the client terminal via the network in response to a transmission request from the client terminal, in which position information is inserted in the video-stream layer, the position information showing arrangement positions of the plurality of images, and the metafile generator generates the metafile containing information showing to constantly read the predetermined number of video streams.

According to the present technology, a metafile generator generates a metafile containing information to be used by a client terminal to obtain a predetermined number of video streams. The predetermined number of video streams contains encoded image data of a plurality of images of a multi-image-arrangement distribution service, a distribution server being capable of distributing the multi-image-arrangement distribution service via a network. In this case, position information is inserted in the video-stream layer, the position information showing arrangement positions of the plurality of images.

The metafile transmitting unit transmits a metafile to a client terminal via a network in response to a transmission request from the client terminal. The metafile generator generates the metafile containing information showing to constantly read the predetermined number of video streams.

As described above, according to the present technology, the metafile contains information showing to constantly read the predetermined number of video streams. Therefore the receiving side constantly reads a predetermined number of video streams based on the information of the metafile. So it is possible to obtain image data of a multi-image-arranged image successfully.

Note that according to the present technology, for example, the metafile generator may generate the metafile further containing identification information, the identification information identifying if the predetermined number of video streams are still-image streams or moving-image streams. Therefore the client terminal is capable of determining if a predetermined number of video streams are still-image streams or moving-image streams easily.

Effect of the Invention

According to the present technology, it is possible to provide the multi-image-arrangement distribution service successfully. Note that effects are not necessarily limited to those described here, and may be any effect described in the present disclosure.

BRIEF DESCRIPTION OF DRAWINGS

FIG. 2 A diagram showing an example of horizontal/vertical two-dimensional multi-image arrangement.

FIG. 3 A diagram showing an example of a horizontal one-dimensional multi-image arrangement.

FIG. 14 A diagram showing a structural example (Syntax) of a group picture tag SEI (Group_picture_tag SET).

FIG. 15 A diagram showing content (Semantics) of main information of the structural example of a group picture tag SEI.

FIG. 19 A diagram showing a structural example (Syntax) of a multi-stream-service descriptor (multi_stream_service_descriptor).

FIG. 20 A diagram showing a content (Semantics) of main information of the structural example of a multi-stream-service descriptor.

FIG. 21 A diagram showing a structural example (Syntax) of the mixed stream descriptor (mixed_stream_descriptor), and content (Semantics) of main information of the structural example.

FIG. 22 A diagram showing a structural example (Syntax) of the picture lifetime descriptor (Picture_lifetime_descriptor), and content (Semantics) of the main information of the structural example.

FIG. 36 A diagram showing a description example of an MPD file of the multi-image-arrangement distribution service.

FIG. 37 A diagram showing a description example of an MPD file of the multi-image-arrangement distribution service.

MODE(S) FOR CARRYING OUT THE INVENTION

Hereinafter, an embodiment of the invention (hereinafter referred to as "embodiment") will be described. Note that description will be made in the following order.

1. Embodiment
2. Modification example

1. Embodiment

[Structural Example of Distribution System]

Figure 1:
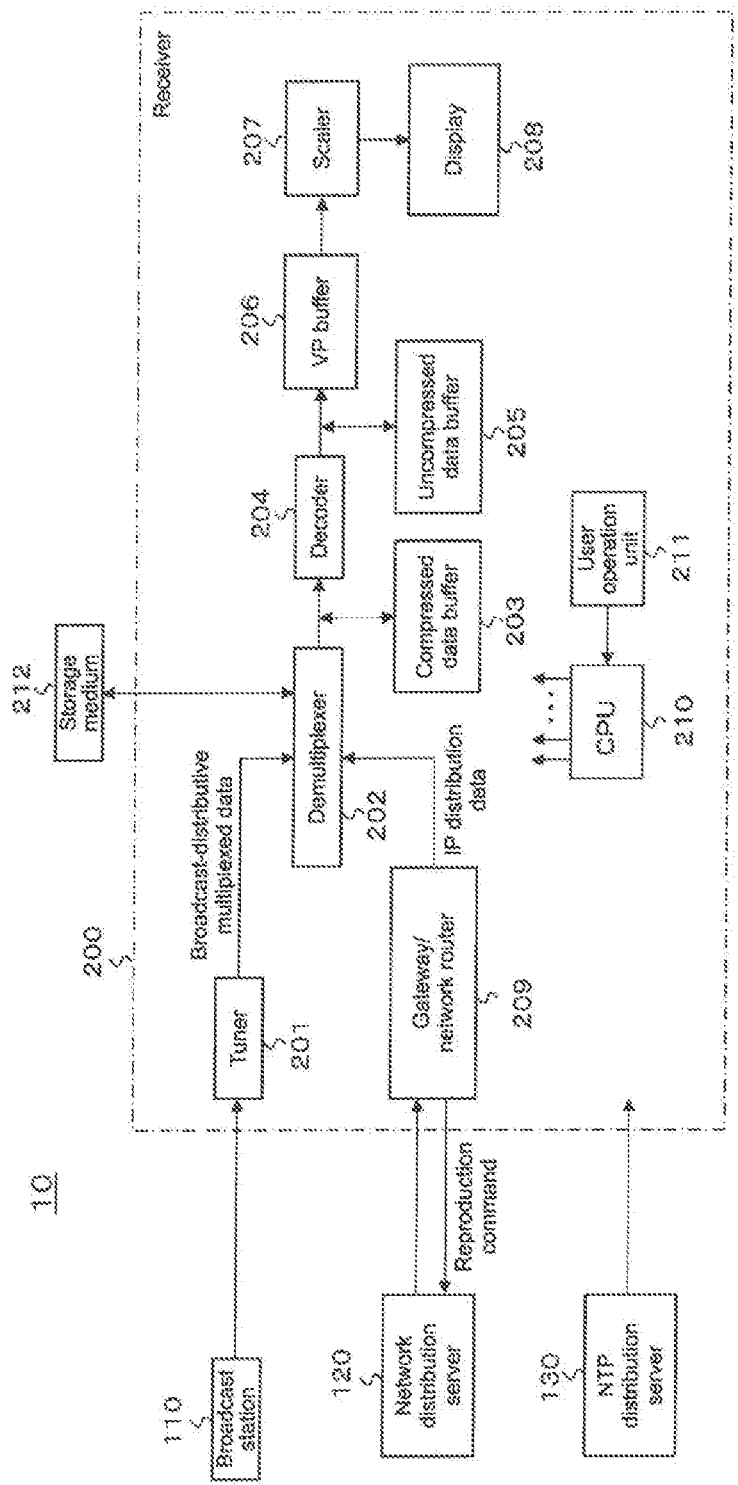
FIG. 1 A block diagram showing a structural example of a distribution system of an embodiment.

FIG. 1 shows a structural example of the distribution system 10. In the distribution system 10, the broadcast station 110, the network distribution server 120, and the NTP (Network Time Protocol) distribution server 130 are arranged at the transmitting side, and the receiver 200 is arranged at the receiving side.

The broadcast station 110 provides linear services of still images and moving images via an RF transmission path, or download services of still images and moving images. The broadcast station 110 transmits containers of MPEG2-TS (hereinafter simply referred to as "transport stream"), for example, as broadcast-distributive multiplexed data. In this embodiment, the transport stream includes a predetermined number of video streams, each of which includes encoded image data of a plurality of images (pictures) of a multi-image-arrangement distribution service.

Examples of the multi-image arrangement include: the horizontal/vertical two-dimensional multi-image arrangement, in which a plurality of images are two-dimensionally arranged in the horizontal/vertical directions; the horizontal one-dimensional multi-image arrangement, in which a plurality of images are one-dimensionally arranged in the horizontal direction; the vertical one-dimensional multi-image arrangement, in which a plurality of images are one-dimensionally arranged in the vertical direction; and the like.

In the video-stream layer, in addition to the position information showing the arrangement positions of a plurality of images, offset information for adjusting display timing of the plurality of images, type information showing the type of the multi-image arrangement, type information showing the rotation type when displaying the plurality of images, and the like are inserted. For example, if image data is encoded based on AVC (Advanced Video Coding), HEVC (High Efficiency Video Coding), or the like, such information is inserted in a newly-defined SEI message.

FIG. 2 shows an example of the horizontal/vertical two-dimensional multi-image arrangement. In this example, four images are arranged in the horizontal direction, and four images are arranged in the vertical direction. A multi-image-arranged image (hereinafter referred to as "group picture" as necessary) containing the 4×4 images has a resolution corresponding to that of a virtual display. For example, if one image has the H-ID resolution, then the group picture has the 8K resolution.

Each of "0000" to "1111" shows 4-bit data, i.e., position information of each image. In this ease, the former 2 bits show any one position of the quarter of the virtual display. Further, the latter 2 bits show any one position of the smaller quarter of each quarter. Further, "Picture rendering type" is type information showing a multi-image-arrangement type. "Picture rendering type=011" means the horizontal/vertical two-dimensional multi-image arrangement.

FIG. 3 shows an example of the horizontal one-dimensional multi-image arrangement. In this example, five images are arranged in the horizontal direction. The group picture containing the five images has a resolution corresponding to that of the virtual display. For example, if one image has the HD resolution, the group picture has de resolution five times as large as the HD resolution in the horizontal direction.

"1110", "1111", "0000", "0001", or "0010" shows 4-bit data of position information of each image. For example, in the horizontal one-dimensional multi-image arrangement, the position information of the front image is "0000", the position information of the N-th image at the right of the front is "0000+N", and the position information of the N-th image at the left of the front is "0000-N".

Note that description of an example of the vertical one-dimensional multi-image arrangement will be omitted, which is similar to the example of the horizontal one-dimensional multi-image arrangement.

Further, in the transport-stream layer, identification information that means the multi-image-arrangement distribution service, identification information that identifies if the distribution service is moving/still-image mixed service or not, the total number of video streams relating to the multi-image-arrangement distribution service, and the like are inserted. Such information is described in a newly-defined descriptor, which is inserted below a program map table (PMT), for example.

One video stream contains encoded image data of one image or a plurality of images. Further, a video stream is a moving-image stream, a still-image stream, or a moving/still-image mixed stream.

Figure 4:
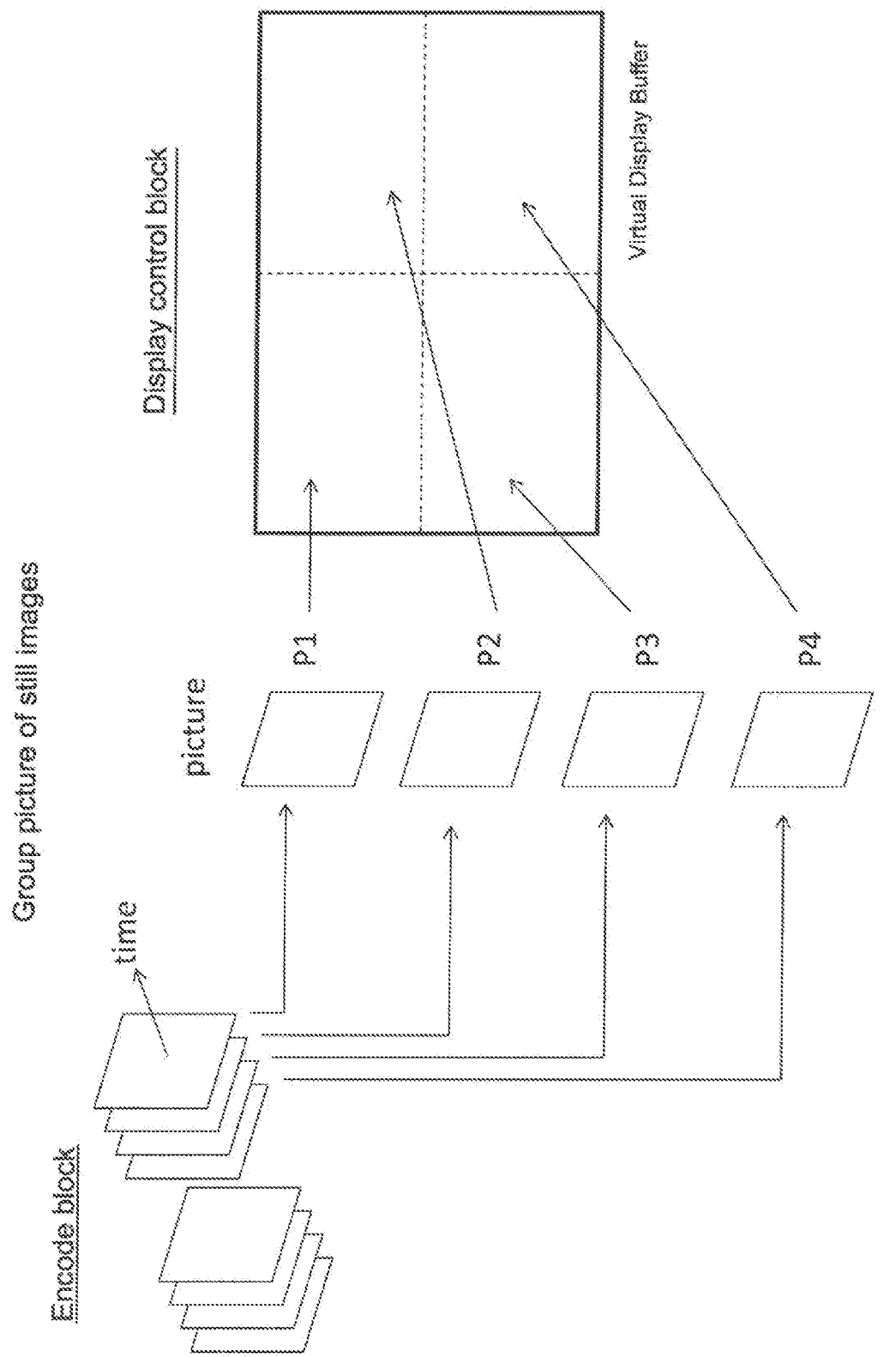
FIG. 4 A diagram showing an example of a group picture containing still images.

FIG. 4 shows an example of a group picture of still images. In this example, the group picture contains 2×2 images (still images). Further, in this example, one video stream transmits encoded image data of the images time-divisionally. In this case, the receiving side decodes encoded data of the images in series, and the image data of each image is written in an area of a virtual display buffer based on its position information.

Figure 5:
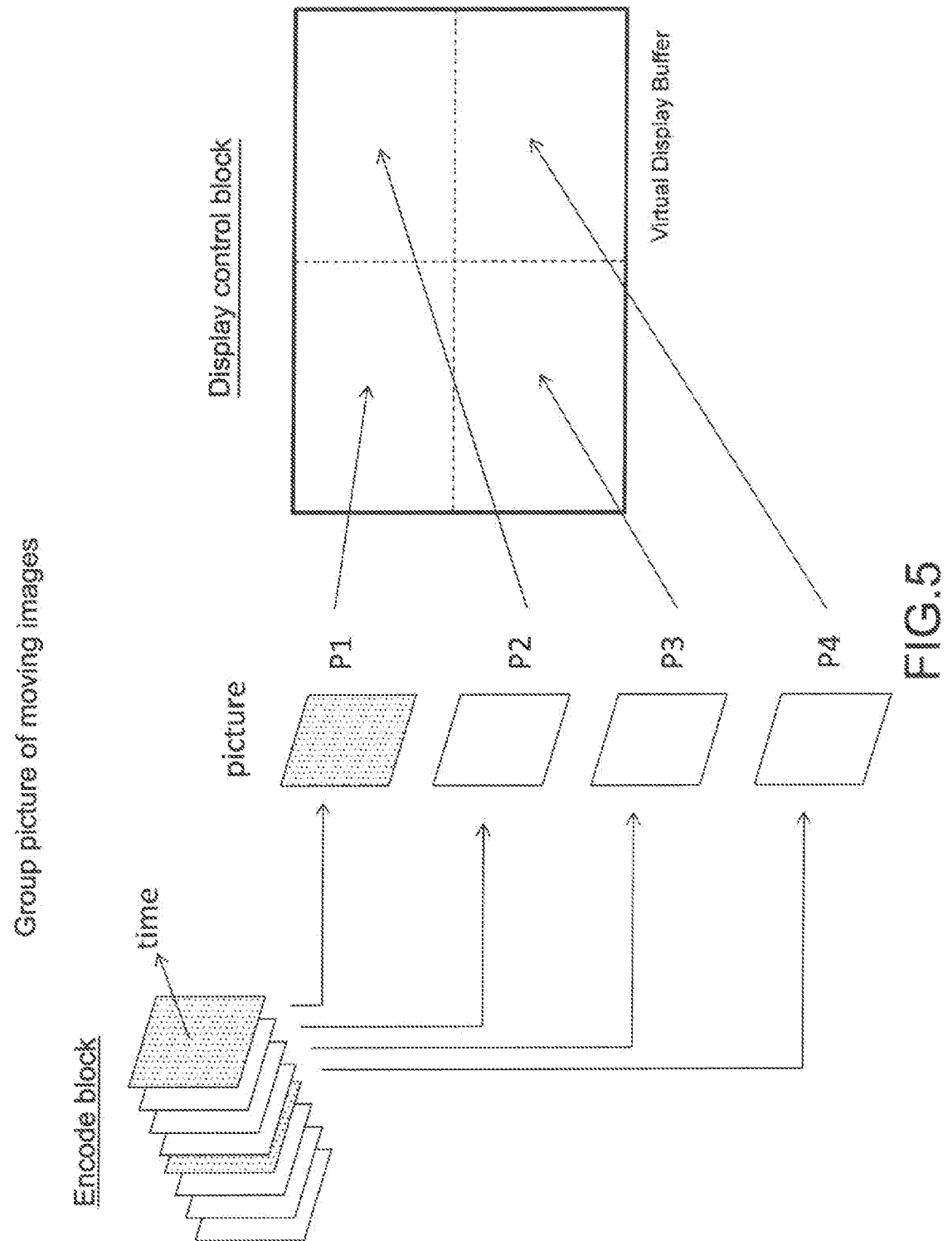
FIG. 5 A diagram showing an example of a group picture containing moving images.

FIG. 5 shows an example of a group picture of moving images. In this example, the group picture contains 2×2 images (moving images). Further, in this example, one video stream transmits encoded image data of the images time-divisionally. In this case, the receiving side decodes encoded data of the images in series, and the image data of each image is written in an area of a virtual display buffer based on its position information.

Figure 6:
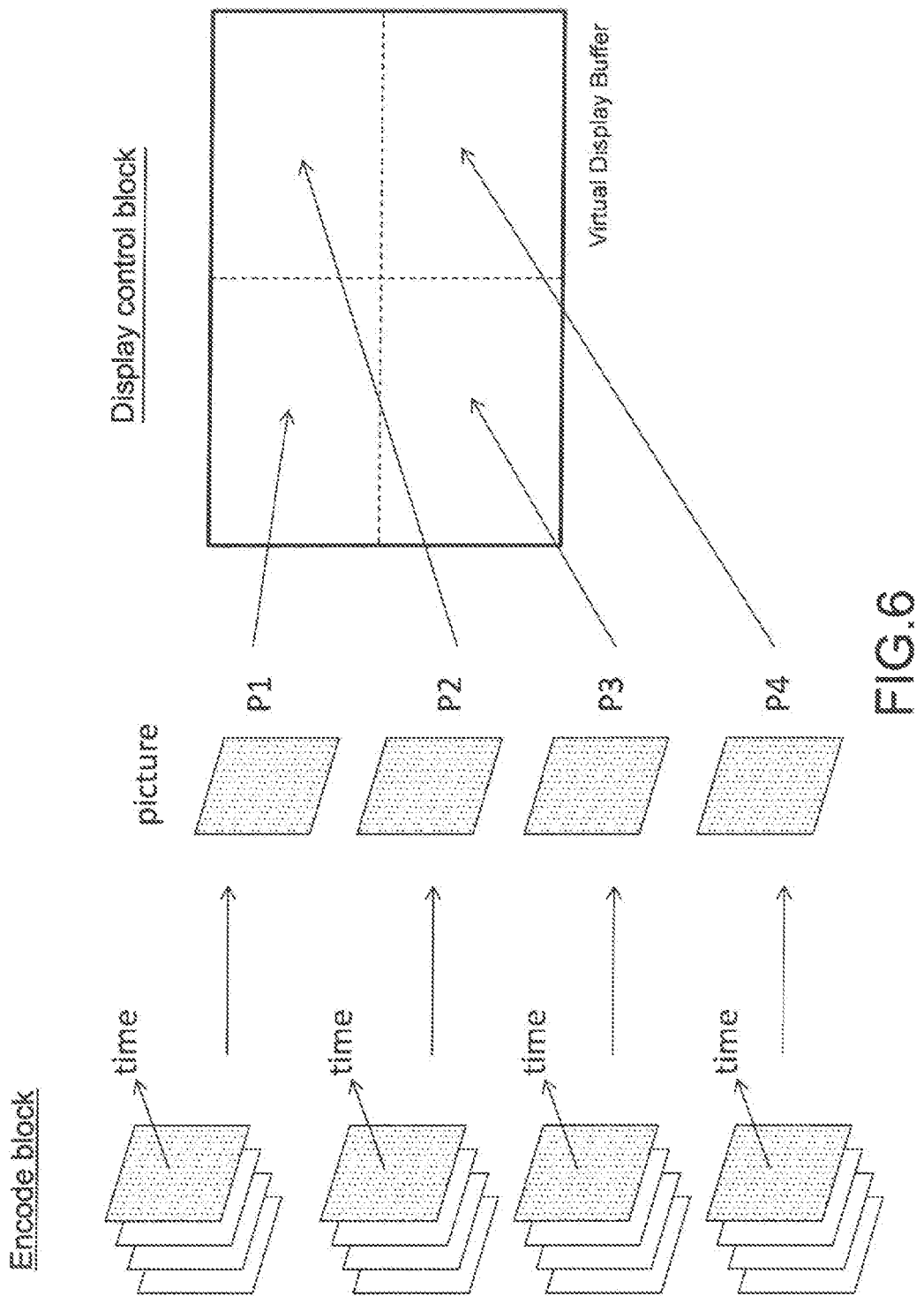
FIG. 6 A diagram showing an example of a group picture containing moving images.

FIG. 6 shows an example of a group picture of moving images. In this example, the group picture contains 2×2 images (moving images). Further, in this example, four video streams transmit encoded image data of the images. In this case, the receiving side decodes encoded data of the images, and the image data of each image is written in an area of a virtual display buffer based on its position information.

Figure 7:
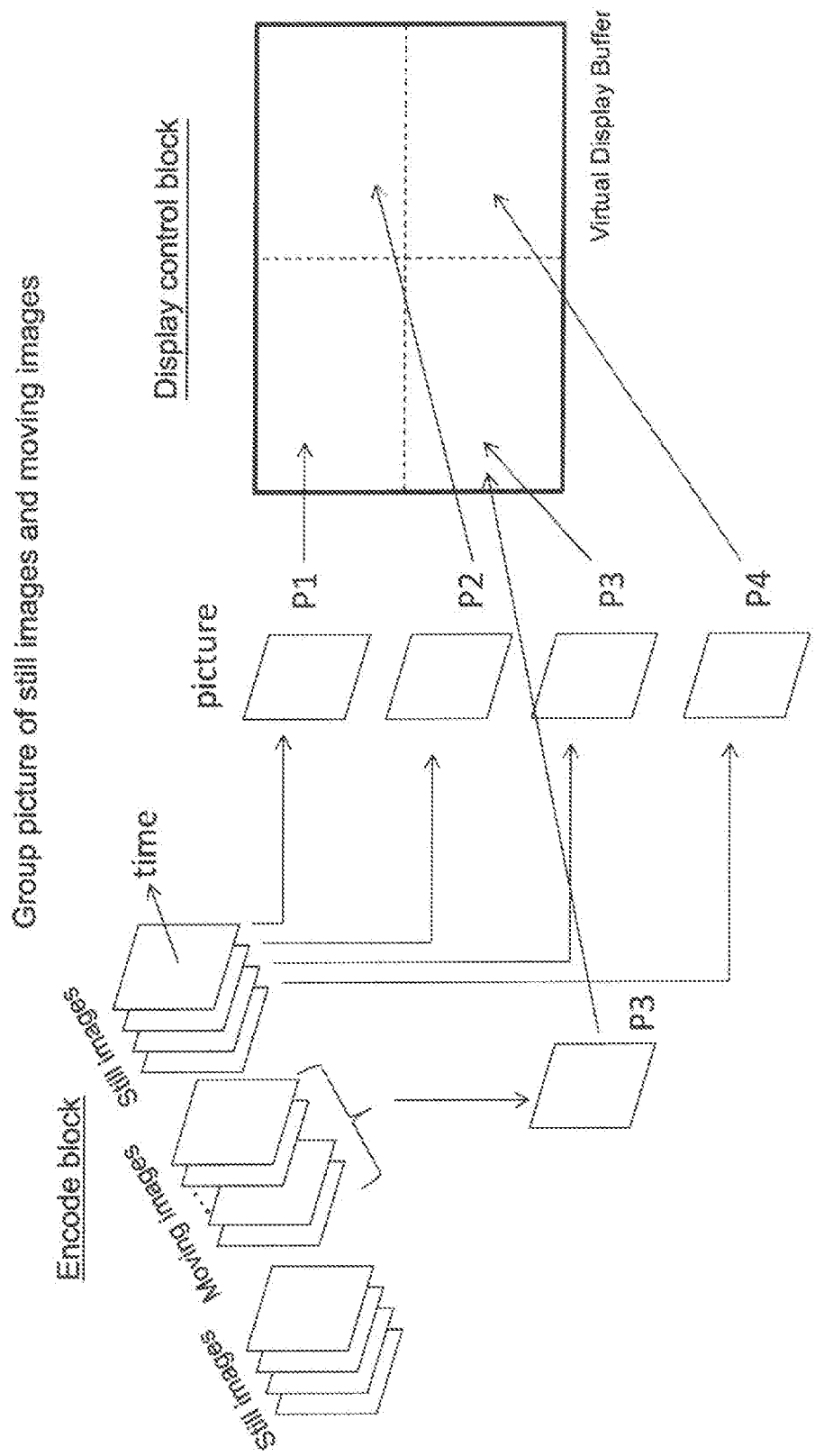
FIG. 7 A diagram showing an example of a group picture of still images and moving images.

FIG. 7 shows an example of a group picture of still images and moving images. In this example, the group picture contains 2×2 images (still images, moving images). Further, in this example, one video stream transmits encoded image data of the images. In this case, the image 3 (Picture 3) contains both still images and moving images. In this case, the receiving side decodes encoded data of the images, and the image data of each image is written in an area of a virtual display buffer based on its position information.

Figure 8:
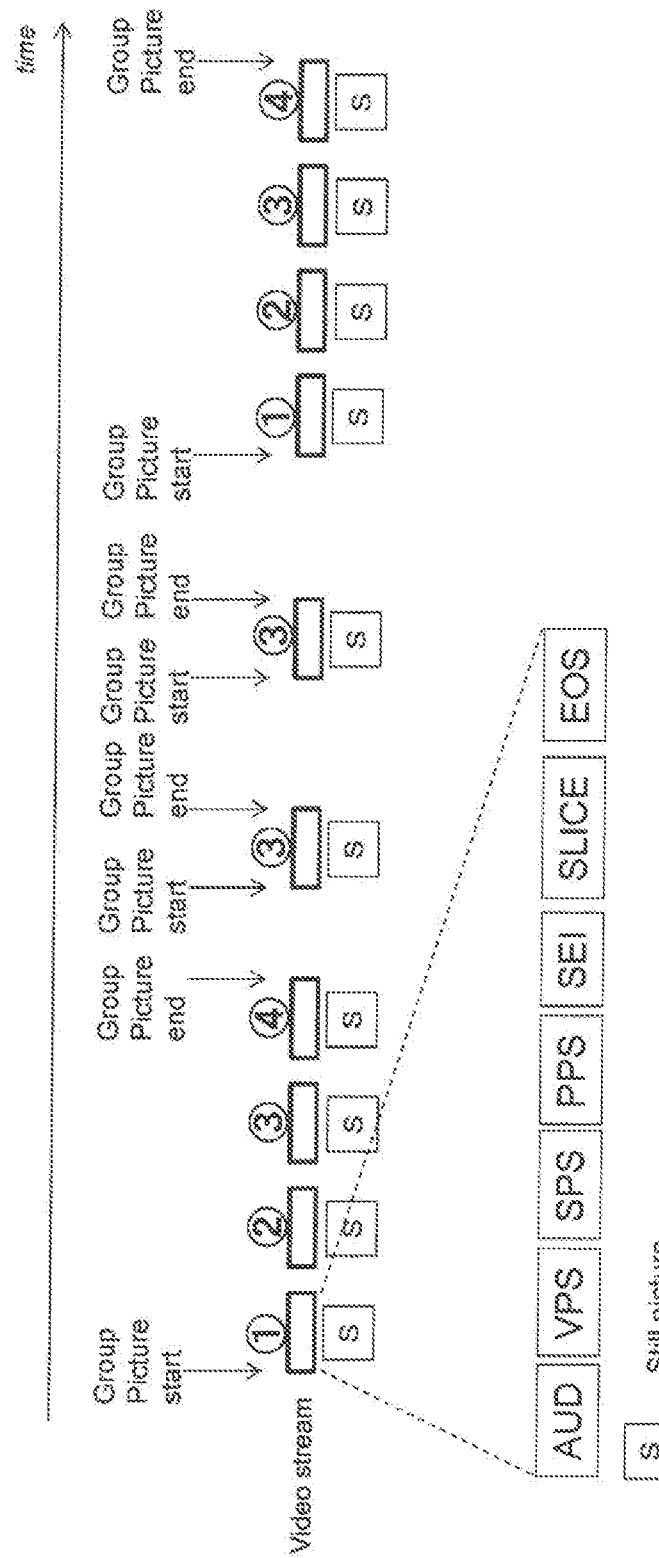
FIG. 8 A diagram showing an example of distribution of still images (Still pictures) service by using a single stream.

FIG. 8 shows an example of distribution of still-image (Still picture) service by using a single stream. In this example, a group picture contains 2×2 images. In FIG. 8, a rectangular unit with a circled number shows an access unit. This example shows HEVC encoding. Note that each of the circled numbers "1" to "4" means that encoded image data of each of the image 1 (Picture 1) to the image 4 (Picture 4) is contained.

Firstly, the encoded image data of the still images of the image 1 (Picture 1) to the image 4 (Picture 4) are transmitted in series. Next, the updated encoded image data of the image 3 (Picture 3) is transmitted. Next, further, the updated encoded image data of the image 3 (Picture 3) is transmitted. Next, the updated encoded image data of the image 1 (Picture 1) to the image 4 (Picture 4) are transmitted in series.

Note that "group_picture_start" means the start of a group picture to be updated and displayed at a certain point of time. Meanwhile, "group_picture_end" means the end of a group picture to be updated and displayed at a certain point of time. Such information is inserted in the video-stream layer as described below. The same applies to the following examples.

Figure 9:
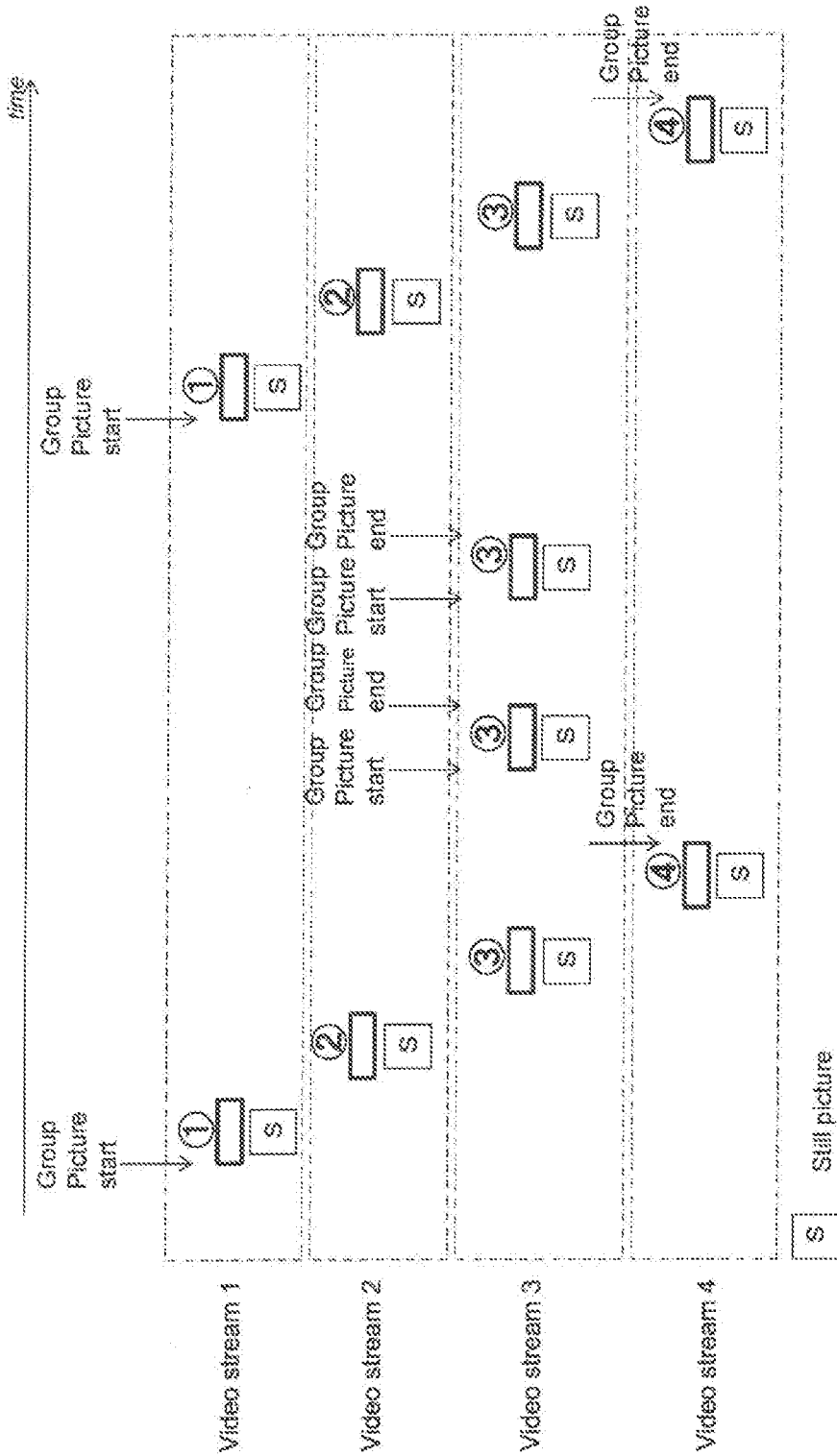
FIG. 9 A diagram showing an example of distribution of still images (Still pictures) service by using a plurality of streams.

FIG. 9 shows an example of distribution of still-image (Still picture) service by using multi-streams. In this example, a group picture contains 2×2 images. In FIG. 8, a rectangular unit with a circled number shows an access unit. Note that each of the circled numbers "1" to "4" means that encoded image data of each of the image 1 (Picture 1) to the image 4 (Picture 4) is contained.

Firstly, the encoded image data of the image 1 (Picture 1) to the image 4 (Picture 4) are transmitted in series by using the video streams 1 to 4, respectively. Next, the updated encoded image data of the image 3 (Picture 3) is transmitted by using the video stream 3. Next, further, the updated encoded image data of the image 3 (Picture 3) is transmitted by using the video stream 3. Next, the updated encoded image data of the image 1 (Picture 1) to the image 4 (Picture 4) are transmitted in series by using the video streams 1 to 4, respectively.

Figure 10:
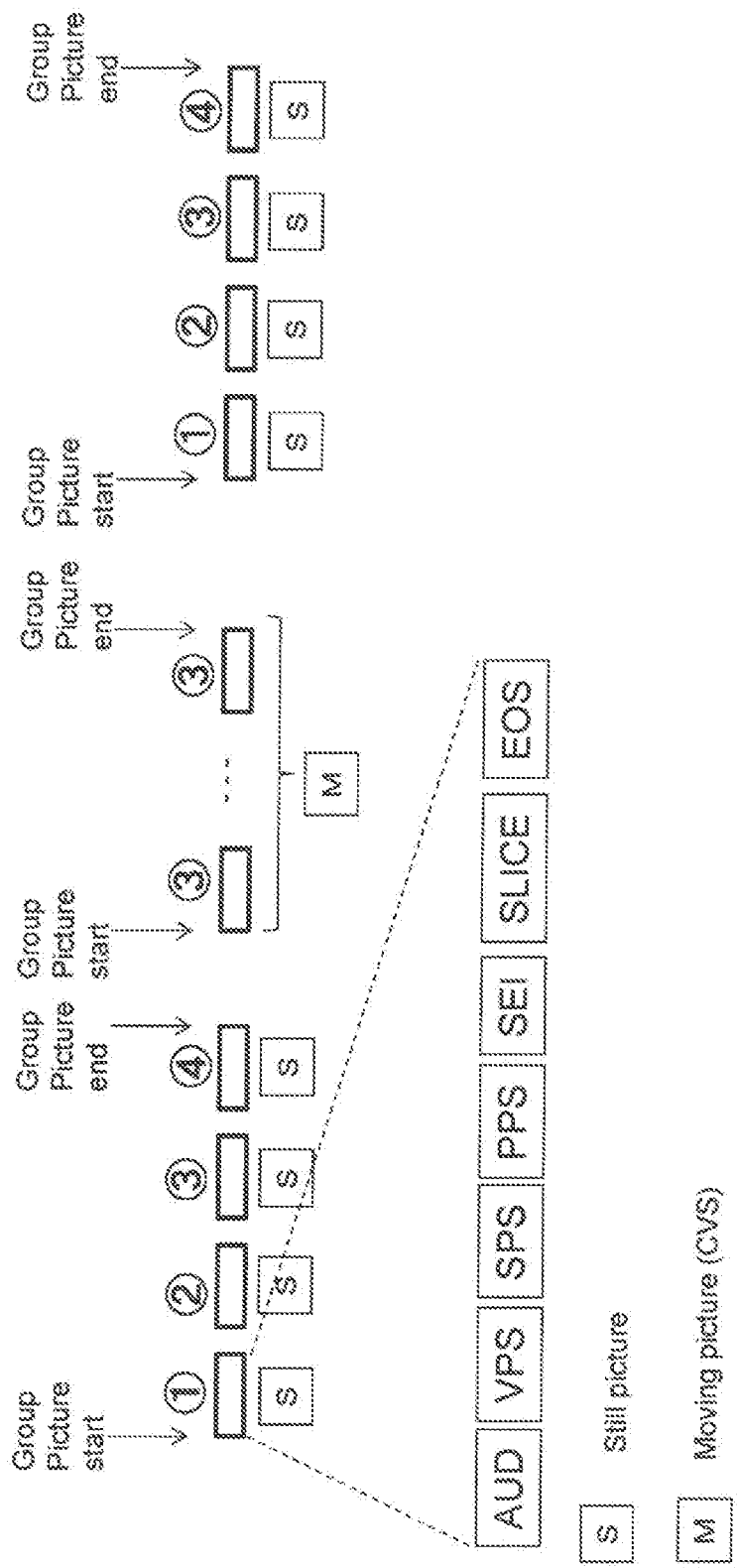
FIG. 10 A diagram showing an example of distribution of mixed service of still images (Still pictures) and moving images (Moving pictures) by using a single stream.

FIG. 10 shows an example of distribution of mixed service of still images (Still pictures) and moving images (Moving pictures) by using a single steam. In this example, a group picture contains 2×2 images. In FIG. 8, a rectangular unit with a circled number shows an access unit. Note that each of the circled numbers "1" to "4" means that encoded image data of each of the image 1 (Picture 1) to the image 4 (Picture 4) is contained.

Firstly, the encoded image data of the still images of the image 1 (Picture 1) to the image 4 (Picture 4) are transmitted in series. Next, the encoded image data of the moving image of the image 3 (Picture 3) is transmitted. Next, the updated encoded image data of the still images of the image 1. (Picture 1) to the image 4 (Picture 4) are transmitted in series.

Figure 11:
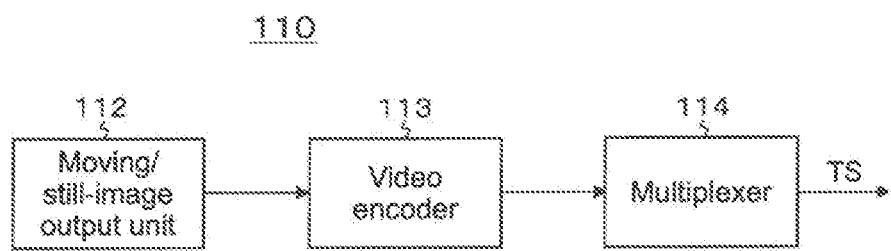
FIG. 11 A block diagram showing a structural example of a transmission-data generator, which generates a transport stream.

FIG. 11 shows a structural example of the transmission-data generator 110, which generates the transport stream, of the broadcast station 110. The transmission-data generator 110 includes the moving/still-image output unit 112, the video encoder 113, and the multiplexer 114.

The moving/still-image output unit 112 outputs image data of a plurality of images of the multi-image-arrangement distribution service. The moving/still-image output unit 112 includes, for example, a camera that captures an image of an object and outputs image data, an image-data reader that reads image data in a recording medium and outputs the image data, or the like. In the still-image service (for example, see FIG. 4), image data of a plurality of still images is output. In the moving-image service (for example, see FIG. 5 and FIG. 6), image data of a plurality of moving images is output. Further, in the moving/still-image mixed service (for example, see FIG. 7), image data of a plurality of moving images and still images is output.

The video encoder 13 encodes image data of a plurality of images output from the moving/still-image output unit 112 based on AVC, HEVC, or the like, for example, and obtains encoded image data. Further, the video encoder 113 generates a predetermined number of video streams (video elementary streams) containing encoded image data by using a stream formatter at the latter stage. In this case, one video stream contains encoded image data of one image of the multi-image arrangement, or may contain encoded image data of a plurality of images of the multi-image arrangement.

Here, the video encoder 113 inserts, in the video-stream layer, in addition to the position information showing the arrangement positions of a plurality of images, offset information for adjusting display timing of the plurality of images, type information showing the type of the multi-image arrangement, type information showing the rotation type when displaying the plurality of images, and the like. If image data is encoded based on AVC (Advanced Video Coding), HEVC (High Efficiency Video Coding), or the like, such information is inserted in a newly-defined SEI message. Such information will be described later in detail.

The multiplexer 114 generates packets of the video streams generated by the video encoder 113, multiplexes the packets, and generates a transport stream. Here, the multiplexer 114 inserts, in the container layer (system layer), identification information that means the multi-image-arrangement distribution service, identification information that identifies if the distribution service is moving/still-image mixed service or not, the total number of video streams relating to the multi-image-arrangement distribution service, and the like. Such information is described in a newly-defined descriptor, which is inserted below a program map table (PMT), for example. Such information will be described later in detail.

Behaviors of the transmission-data generator 110 of FIG. 11 will be roughly described. The moving/still-image output unit 112 outputs image data of a plurality of images of the multi-image-arrangement distribution service. The image data is supplied to the video encoder 113. The video encoder 113 encodes the image data based on AVC, HEVC, or the like, for example, and obtains encoded image data. Further, the video encoder 113 generates a predetermined number of video streams containing the encoded image data.

At this time, the video encoder 113 inserts, in the video-stream layer, by using a newly-defined SEI message for example, in addition to the position information showing the arrangement positions of a plurality of images, offset information for adjusting display timing of the plurality of images, type information showing the type of the multi-image arrangement, type information showing the rotation type when displaying the plurality of images, and the like.

Further, the predetermined number of video streams, which are output from the video encoder 113, are supplied to the multiplexer 114. The multiplexer 114 generates packets of the video streams, multiplexes the packets, and generates a transport stream. At this time, the multiplexer 114 inserts, in the transport-stream layer, by using a newly-defined descriptor, identification information that means the multi-image-arrangement distribution service, identification information that identifies if the distribution service is moving/still-image mixed service or not, the total number of video streams relating to the multi-image-arrangement distribution service, and the like.

[TS Structure, SEI Message Structure, and Descriptor Structure]

Figure 12:
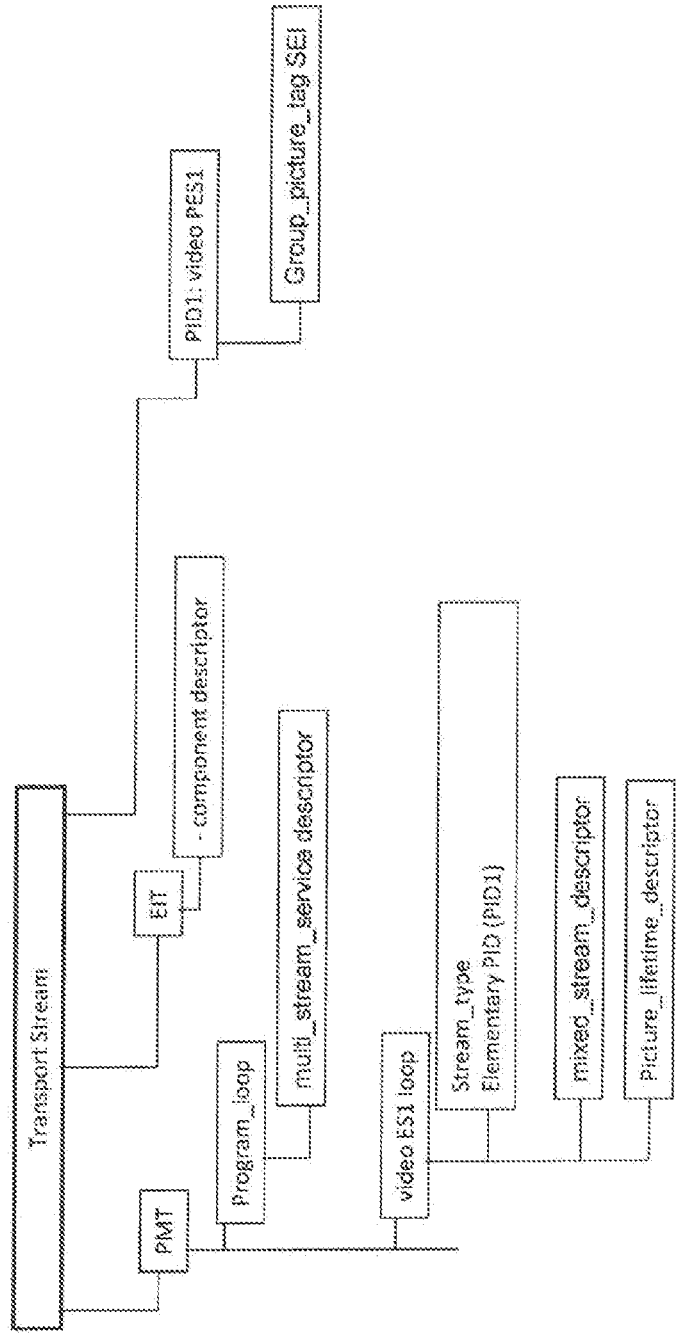
FIG. 12 A diagram showing a structural example of a transport stream in distribution using a single stream.

FIG. 12 shows a structural example of a transport stream in distribution using a single stream. A transport stream contains one video stream. In other words, according to the structural example, there is a PES packet "video PES1" of a video stream containing encoded image data. The video stream contains encoded image data of a plurality of images of the multi-image-arrangement distribution service.

In the video stream, a group picture tag SEI (Group_picture_tag SEI) message is inserted for each access unit of encoded image data of each image. By using the SEI message, as described above, in the video-stream layer, in addition to the position information showing the arrangement positions of a plurality of images, offset information for adjusting display timing of the plurality of images, type information showing the type of the multi-image arrangement, type information showing the rotation type when displaying the plurality of images, and the like are inserted.

Further, a transport stream TS contains a PMT (Program Map Table) as PSI (Program Specific Information). The PSI is information describing programs, to which elementary streams contained in the transport stream belong.

The PMT contains a program loop that describes overall information on the programs. A multi-stream-service descriptor (multi_stream_service_descriptor) is inserted below the program loop. Further, the PMT contains an elementary loop having information on the elementary streams. According to the structural example, the PMT contains a video elementary loop (video ES1 loop).

In the video elementary loop, corresponding to the video stream (video PES1), information such as a stream type and a packet identifier (PID) is arranged, and a descriptor that describes information on the video stream is also arranged.

As such descriptors, a mixed stream descriptor (mixed_stream_descriptor) and a picture lifetime descriptor (Picture_lifetime_descriptor) are inserted.

By using the descriptors inserted below the PMT, as described above, identification information that means the multi-image-arrangement distribution service, identification information that identifies if the distribution service is moving/still-image mixed service or not, the total number of video streams relating to the multi-image-arrangement distribution service, and the like are inserted.

Figure 13:
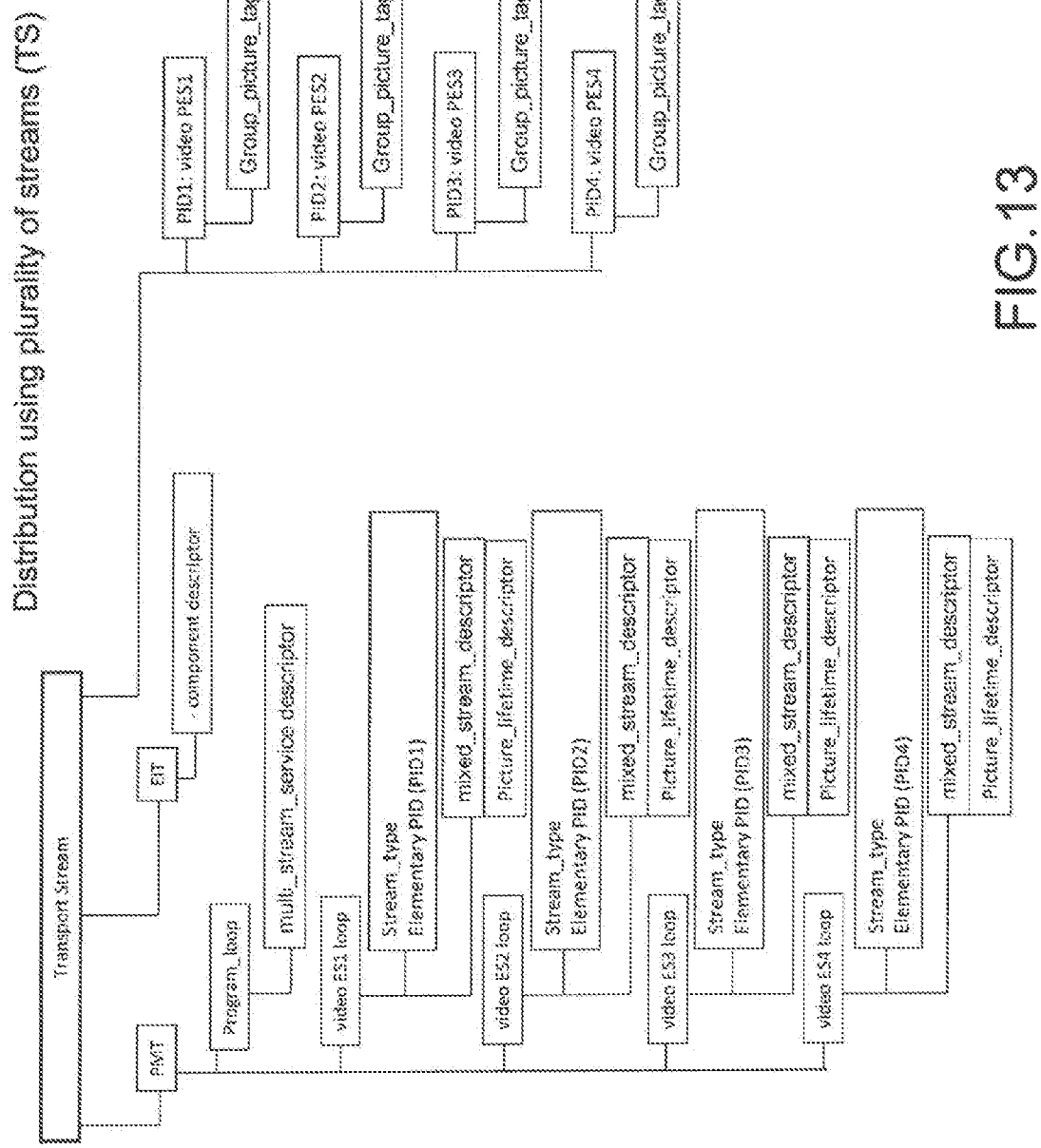
FIG. 13 A diagram showing a structural example of a transport stream in distribution using a plurality of streams.

FIG. 13 shows a structural example of a transport stream in distribution using a plurality of streams, i.e., four streams in this case. A transport stream contains four video streams. In other words, according to the structural example, there are PES packets "video PES1, video PES2, video PES3, and video PES4" of a video stream containing encoded image data. The video stream contains encoded image data of a plurality of images of the multi-image-arrangement distribution service.

In the video streams, a group picture tag SEI (Group_picture_tag SEI) message is inserted for each access unit of encoded image data of each image. By using the SEI message, as described above, in the video-stream layer, in addition to the position information showing the arrangement positions of a plurality of images, offset information for adjusting display timing of the plurality of images, type information showing the type of the multi-image arrangement, type information showing the rotation type when displaying the plurality of images, and the like are inserted.

Further, a transport stream TS contains a PMT (Program Map Table) as PSI (Program Specific Information). The PSI is information describing programs, to which elementary streams contained in the transport stream belong.

The PMT contains a program loop that describes overall information on the programs. A multi-stream-service descriptor (multi_stream_service_descriptor) is inserted below the program loop. Further, the PMT contains an elementary loop having information on the elementary streams. According to the structural example, the PMT contains four video elementary loops (video ES1 loop, video ES2 loop, video ES3 loop, and video ES4 loop).

In the video elementary loops, corresponding to each video stream, information such as a stream type and a packet identifier (PID) is arranged, and a descriptor that describes information on the video stream is also arranged. As such descriptors, a mixed stream descriptor (mixed_stream_descriptor) and a picture lifetime descriptor (Picture_lifetime_descriptor) are inserted.

By using the descriptors inserted below the PMT, as described above, identification information that means the multi-image-arrangement distribution service, identification information that identifies if the distribution service is moving/sill-image mixed service or not, the total number of video streams relating to the multi-image-arrangement distribution service, and the like are inserted.

FIG. 14 shows a structural example (Syntax) of a group picture tag SEI (Group_picture_tag SEI). Further, FIG. 15 shows content (Semantics) of main information of the structural example. The 8-bit field "group_picture_id" is association information for assembled display including a plurality of pictures including still images. In other words, the images of a group picture (multi-image-arranged image) have the same "group_picture_id".

The 3-bit field "picture rendering type" shows an arrangement type, i.e., a multi-image-arrangement type, of the images in the group picture. "001" means the horizontal one-dimensional multi-image arrangement, "010" means the vertical one-dimensional multi-image arrangement, and "011" means the horizontal/vertical two-dimensional multi-image arrangement. Thanks to this information, the receiving side is capable of recognizing the multi-image-arrangement type appropriately, and arranging a plurality of images appropriately.

The 1-bit field "lifetime controlled" shows if the display-allowed time is restricted or not "1" means that the display-allowed time is restricted. In this case, display is allowed by NTP time determined based on the system layer (container layer). "0" means that the display-allowed time is not restricted, i.e., that display is allowed for an indefinite period. Thanks to this information, for example, the receiving side is capable of automatically controls the virtual display buffer to delete image data stored therein.

The 4-bit field "location_ID" shows the arrangement positions of the images in the group picture (see FIG. 2 and FIG. 3). The 8-bit field "version_number" is an ascending value showing update of the images. Based on this information, for example, it is possible to update the still images in the group picture in series. The 4-bit field "number_of_pictures" is the total number of the images in the group picture, i.e., the maximum number of simultaneously-displayed images having the same "group_picture_id".

The 3-bit field "display_coordinate" shows a rotation type during display. "010" means clockwise 90-degree rotation display of each image. "011" means anticlockwise 90-degree rotation display of each image. "110" means clockwise 90-degree rotation display of the whole group picture. "111" means anticlockwise 90 degree rotation display of the whole group picture. Thanks to this information, it is possible to display a plurality of images in a group picture in the rotation status that the service side wants to provide.

Figure 16:
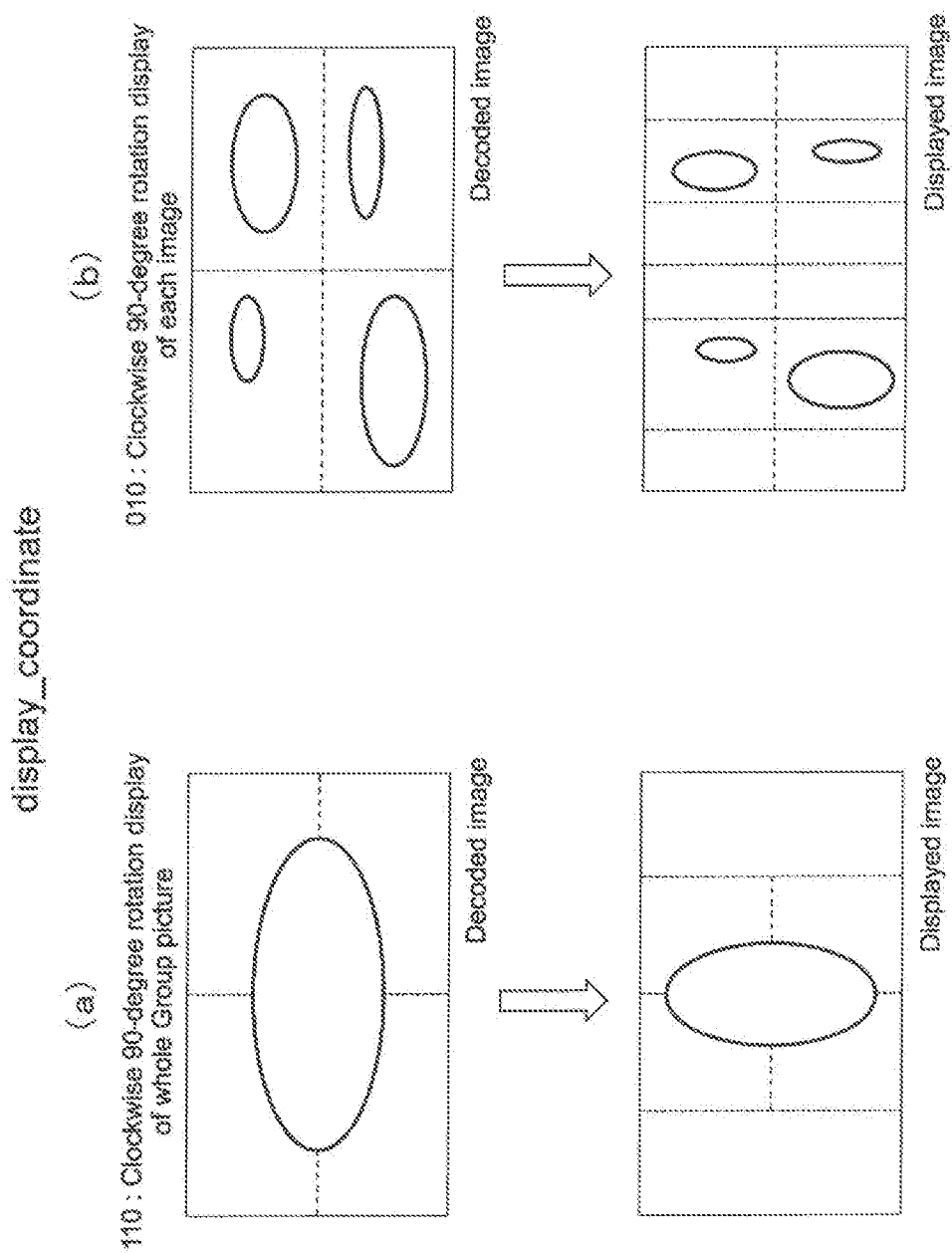
FIG. 16 A diagram showing an example rotation during display based on "display_coordinate".

FIG. 16 shows an example of rotation during display based on "display_coordinate". This example shows the horizontal/vertical two-dimensional multi-image arrangement, in which a group picture contains 2×2 images. FIG. 16(a) shows an example in which "display_coordinate" is "110". The displayed image is obtained by rotating the whole group picture, i.e., the decoded image, clockwise by 90 degrees. Further, FIG. 16(b) shows an example in which "display_coordinate" is "010", The displayed image is obtained by rotating the respective images (pictures), i.e., the decoded image, clockwise by 90 degrees.

With reference to FIG. 14 again, the 1-bit field "group_picture_start" shows the start of a group picture to be updated and displayed at a certain point of time. The 1-bit field "group_picture_end" shows the end of a group picture to be updated and displayed at a certain point of time. The 8-bit field "PTD (Presentation Time Distance)" is an offset value, which is used to simultaneously display the images in a group picture. In other words, the "PTD" is offset information, which is used to adjust display timing of a plurality of images in a group picture.

The display timing CTP(i) of a picture(i) in a group picture may be obtained based on PTD(i) as shown in the following mathematical formula (1). Here, PTD(max) is the PTD of the image having the latest display timing (PTS) out of the images having the same "group_picture_id" between "group_picture_start" and "group_picture_end".

$$CTP(i)=PTS(i)+PTD(\max)-PTD(i))\times \text{system clock accuracy(90 KHz)} \quad (1)$$

Figure 17:
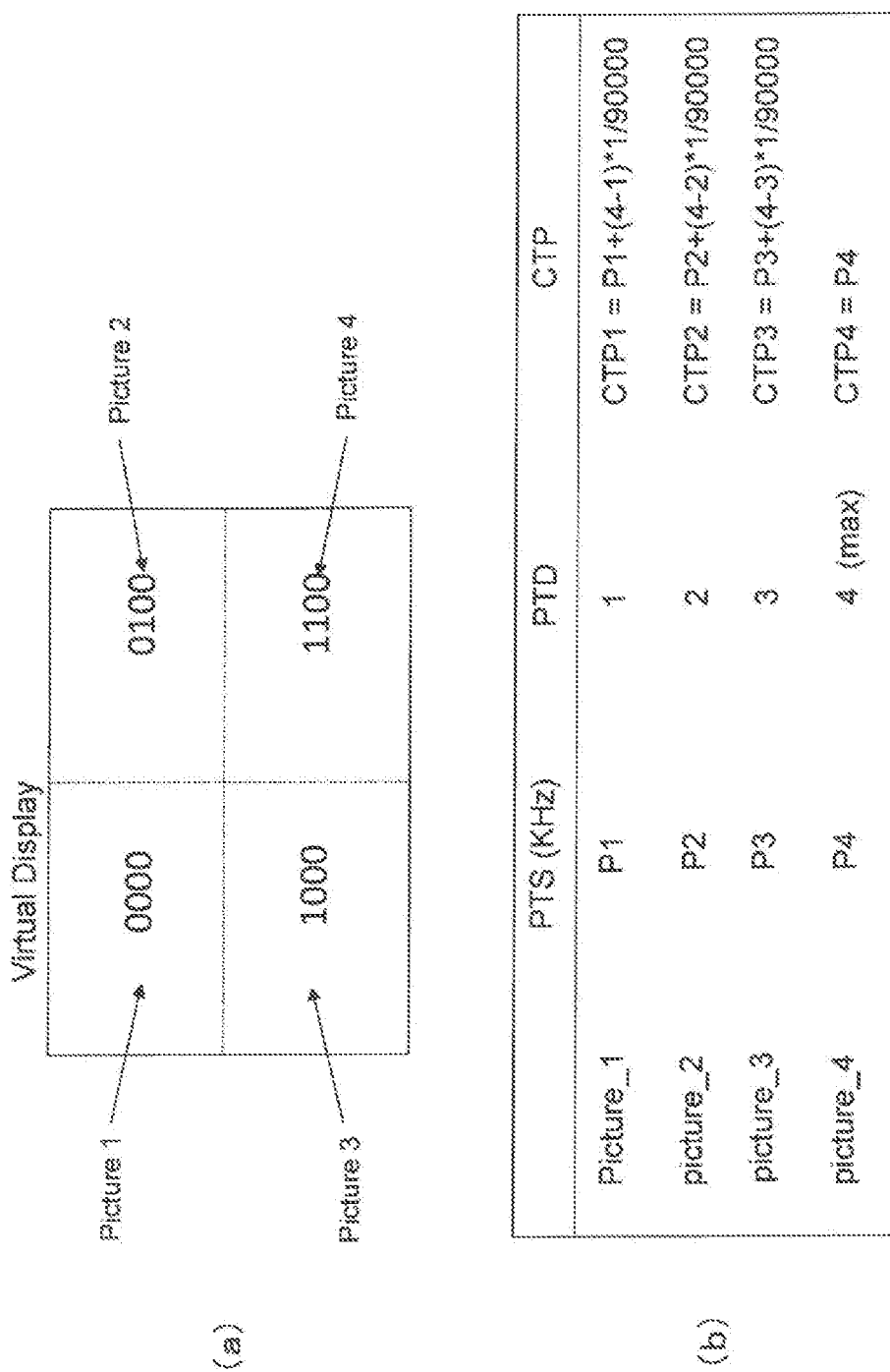
FIG. 17 A diagram showing a calculation example of the display timing CTPs of the images in a group picture.

FIG. 17 shows a calculation example of the display timing CTPs of the images in a group picture. This example is, as shown in FIG. 17(a), an example of the horizontal/vertical two-dimensional multi, image arrangement, in which a group picture contains 2×2 images (Picture 1, Picture 2, Picture 3, and Picture 4). In this case, as shown in FIG. 17(b), for example, the PTSs of the images are P1, P2, P3, and p4, and 1, 2, 3, and 4 are set as the PTDs of the images. PTD(max)=4 is satisfied.

In this case, "P1+4−1)×1/90000" is obtained as the display timing CTP 1 of the image 1 (Picture 1). Further, "P2+(4−2)×1/90000" is obtained as the display timing CTP 2 of the image 2 (Picture 2). Further, "P3+(4−3)×1/90000" is obtained as the display timing CTP 3 of the image 3 (Picture 3). Further, "P4+(4−4)×1/90000=P4" is obtained as the display timing CTP 4 of the image 4 (Picture 4). Note that the display timing of the images in a group picture are shifted by setting different CTP values.

Figure 18:
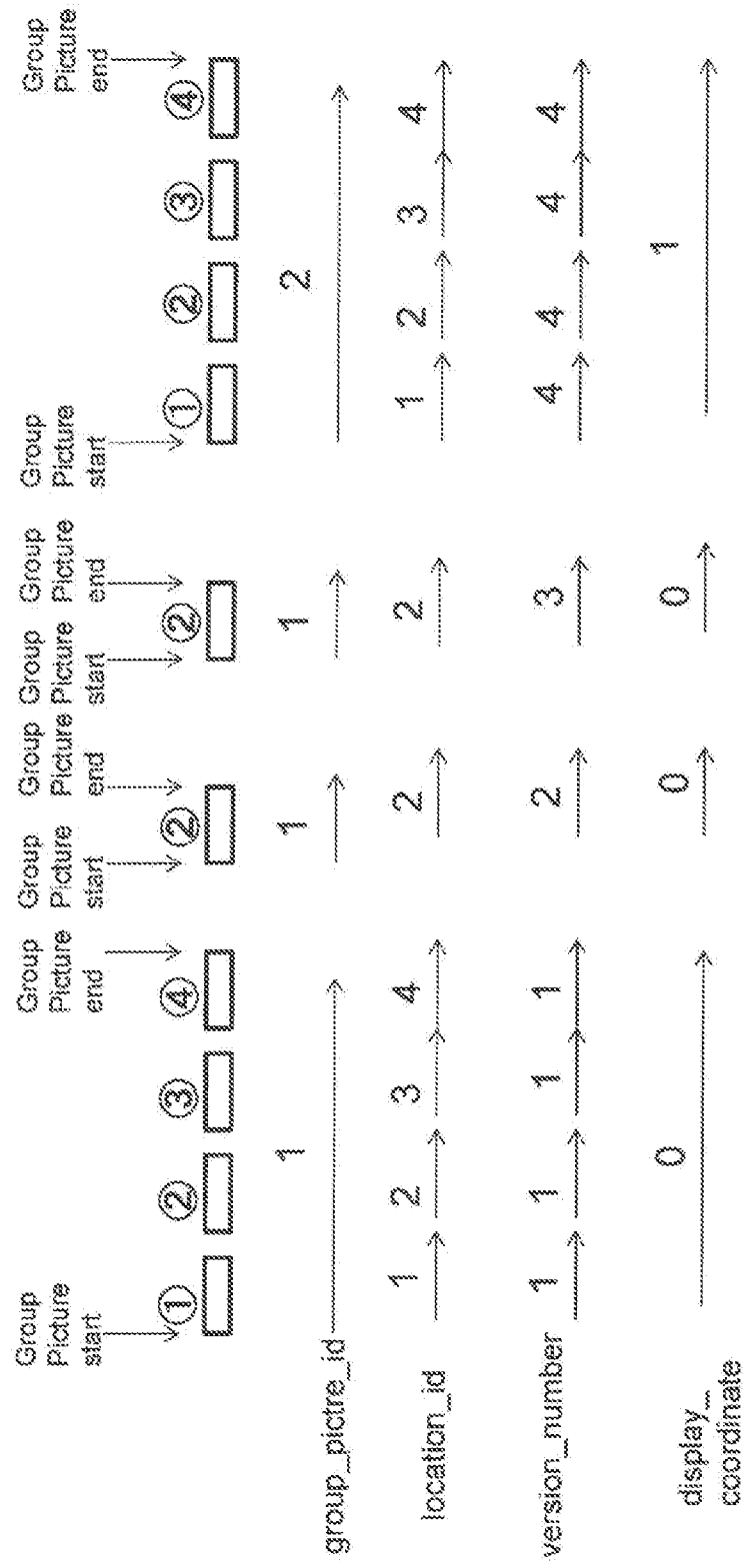
FIG. 18 A diagram showing an example of transition of various kinds of information on a group picture tag SEI in time series.

FIG. 18 shows an example of transition of various kinds of information on a group picture tag SEI in time series. In FIG. 18, a rectangular unit with a circled number show's an access unit. Note that each of the circled numbers "1" to "4" means that encoded image data of each of the image 1 (Picture 1) to the image 4 (Picture 4) is contained (see FIG. 17(a)).

Firstly, the encoded image data of the still images of the image 1 (Picture 1) to the image 4 (Picture 4), having "1" as "group_picture_id", are transmitted in series. In this case, the encoded image data of the image 1 (Picture 1) to image 4 (Picture 4) contains "1" to "4" as "location_id", "1" as "version_number", and "0" as "display_coordinate". Further, in this case, the encoded image data of the image 1 (Picture 1) contains "group_picture_start" showing the start of the group-picture service, and the encoded image data of the image 4 (Picture 4) contains "group_picture_end" showing the end of the group-picture service.

Next, updated encoded image data of the image 2 (Picture 2) is transmitted. In this case, the encoded image data of the image 2 (Picture 2) contains "2" as "location_id", "2" as "version_number", and "0" as "display_coordinate". Further, in this case, the encoded image data of the image 2 (Picture 2) contains "group_picture_start" showing the start of the group-picture service, and "group_picture_end" showing the end of the group-picture service.

Next, further updated encoded image data of the image 2 (Picture 2) is transmitted. In this case, the encoded image data of the image 2 (Picture 2) contains "2" as "location_id", "3" as "version_number", and "0" as "display_coordinate", Further, in this case, the encoded image data of the image 2 (Picture 2) contains "group_picture_start" showing the start of the group-picture service, and "group_picture_end" showing the end of the group-picture service.

Next, the updated encoded image data of the still images of the image 1 (Picture 1) to the image 4 (Picture 4) are transmitted in series. In this case, the encoded image data of the image 1 (Picture 1) to image 4 (Picture 4) contains "1" to "4" as "location_id", "4" as "version_number", and "1" as "display_coordinate". Further, in this case, the encoded image data of the image 1 (Picture 1 contains "group_picture_start" showing the start of the group-picture service, and the encoded image data of the image 4 (Picture 4) contains "group_picture_end" showing the end of the group-picture service.

FIG. 19 shows a structural example (Syntax) of a multi-stream-service descriptor (multi_stream_service_descriptor) Further, FIG. 20 shows content (Semantics) of main information of the structural example.

The 8-bit field "multi_stream_service_descriptor_tag" shows a descriptor type, i.e., a multi-stream-service descriptor in this example. The 8-bit field "multi_stream_service_descriptor_length" shows the length (size) of the descriptor, i.e., the number of the following bytes as the descriptor length. The 1-bit field "multiple_stream_service_flag" is a flag showing the multiple-distribution service, i.e., the multi-image-arrangement distribution service. "1" shows the multiple-distribution service, and "0" shows the non-multiple-distribution service. Thanks to this information, the receiving side is capable of recognizing the multi-image-arrangement distribution service easily, and preparing for that processing.

The 1-bit field "moving_picture_still_picture_mixed_service" is a flag showing the still/moving-image mixed service. "1" means the still/moving-image mixed service, and "0" means the unmixed service. The 4-bit field "munber_of_streams" shows the total number of streams relating to the multiple-distribution service. "0001" to "1111" mean 1 stream to 15 streams, respectively. Thanks to this information, the receiving side is capable of knowing the total number of the video streams to be processed easily, and processing them appropriately.

FIG. 21(a) shows a structural example (Syntax) of the mixed stream descriptor (mixed_stream_descriptor). Further, FIG. 21(b) shows content (Semantics) of main information of the structural example.

The 8-bit field "mixed_steam_descriptor_tag" shows a descriptor type, i.e., the mixed stream descriptor in this example. The 8-bit field "mixed_stream_descriptor length" shows the descriptor length (size), and the number of the following bytes as the descriptor length. The 2-bit field "service_stream_type" shows the stream type. "01" means the moving-image stream, "10" means the still-image stream, and "11" means the still/moving-image mixed stream. Thanks to this information, the receiving side is capable of knowing the total number of the video streams to be processed easily, and processing them appropriately.

FIG. 22(a) shows a structural example (Syntax) of the picture lifetime descriptor (Picture_lifetime_descriptor). Further, FIG. 22(b) shows content (Semantics) of the main information of the structural example.

The 8-bit field "Picture_lifetime_descriptor tag" shows the descriptor type, i.e., the picture lifetime descriptor in this example. The 8-bit field "Picture_lifetime_descriptor length" shows the descriptor length (size), i.e., the number of the following bytes as the descriptor length. The 16-bit field "number_of_group_pictures" shows the number of group pictures identified by "group_picture_id". The 64-bit field "NTP" shows the clock value determined by the NTP (Network Time Protocol), and can be set for each group picture.

With reference to FIG. 1 again, the network distribution server 120 provides linear services providing still images and moving images or download services providing still images and moving images via a communication network. The network distribution server 120 distributes containers of MP4, for example, as I?distribution data. Similar to the above-mentioned transport streams from the broadcast station 110, the MP4 contains a predetermined number of video streams containing encoded image data of a plurality of images (pictures) of the multi-image-arrangement distribution service. In response to a reproduction command from the receiving side, the network distribution server 120 transmits a transmission stream, in which MP4 IP packets are sequentially arranged, to the receiving side via the communication network.

In the video-stream layer, in addition to the position information showing the arrangement positions of a plurality of images, offset information for adjusting display timing of the plurality of images, type information showing the type of the multi-image arrangement, type information showing the rotation type when displaying the plurality of images, and the like are inserted. Further, in the container layer (system layer, identification information that means the multi-image-arrangement distribution service, identification information that identifies if the distribution service is moving/still-image mixed service or not, the total number of video streams relating to the multi-image-arrangement distribution service, and the like are inserted.

With reference to FIG. 1 again, the receiver 200 includes the tuner 201, the demultiplexer 202, the compressed data buffer (decode buffer) 203, the decoder 204, and the uncompressed data buffer (decoded buffer) 205. Further, the receiver 200 includes the virtual display buffer (VP buffer) 206, the scaler 207, the display (screen device) 208, the gateway/network router 209, the CPU (Central Processing Unit) 210, and the user operation unit 211.

The CPU 210 controls the behaviors of the respective units of the receiver 200. A user is capable of inputting various instructions via the user operation unit 211. The user operation unit 211 includes a remote control unit, a touch panel unit in which instructions are input based on proximity/touch, a mouse, a keyboard, a gesture input unit configured to detect input instructions by using a camera, a sound input unit in which sound instructions are input, and the like.

The tuner 201 receives broadcast waves transmitted from the transmitting side via an RF transmission path, RF-demodulates the broadcast waves, and obtains transport streams as broadcast-distributive multiplexed data. According to this embodiment, as described above, the transport stream contains a predetermined number of video streams containing encoded image data of a plurality of images (pictures) of the multi-image-arrangement distribution service.

The gateway/network router 209 receives a series of IP packets transmitted from the distribution server 120 via the communication network, depackets the series of IP packets, and obtains MP4 as IP distribution data. According to this embodiment, similar to the above-mentioned transport stream, MP4 contains a predetermined number of video streams containing encoded image data of a plurality of images (pictures of the multi-image-arrangement distribution service.

The demultiplexer 202 extracts a predetermined number of video streams from the transport stream (broadcast-distributive multiplexed data obtained by the tuner 201 or MP4 (IP distribution data) obtained by the gateway/network router 209, and temporarily stores the video streams in the compressed data buffer 203. At this time, the demultiplexer 202 extracts various information inserted in the container layer, and transmits the information to the CPU 210. As described above, in this information, identification information showing the multi-image-arrangement distribution service, identification information identifying if the distribution service is the moving/still-image mixed service or not, the total number of video streams relating to the multi-image-arrangement distribution service, and the like are inserted.

Note that the external storage medium 212, e.g., an HDD, is connected to the demultiplexer 202, and the demultiplexer 202 is capable of recording and reproducing the transport stream (broadcast-distributive multiplexed data) obtained by the tuner 201 or MP4 (IP distribution data) obtained by the gateway/network mater 209. The demultiplexer 202 is capable of processing reproduced data obtained from the storage medium 212 in the similar manner.

The decoder 204 fetches a predetermined number of video streams stored in the compressed data buffer 203 at a predetermined decoding-timing, decodes the video streams, obtains image data of the images in a group picture (multi-image-arranged image), and temporarily stores the video streams in the uncompressed data buffer 205. At this time, the decoder 204 extracts various information inserted in a video-stream layer, and transmits the information to the CPU 210. To this information, as described above, in addition to the position information showing the arrangement positions of images, offset information for adjusting display timing of the plurality of images, type information showing the type of the multi-image arrangement, e information showing the rotation type when displaying the images, and the like are inserted.

The virtual display buffer 206 obtains image data of the images m the group picture stored in the uncompressed data buffer 205, and temporarily stores the image data in areas corresponding to the images, respectively. Data is read from the uncompressed data buffer 205 to the virtual display buffer 206 at timing depending on PTS (Presentation Time Stamp), for example (see CTP of FIG. 17).

The sealer 207 reads image data of par or all of the area (display area) of a group picture from the virtual display buffer 206, scales the image data as necessary, and transmits the image to the displays 208. The image data is scaled in order to, for example, adjust the resolution of image data of a display area read from the virtual display buffer 206 to the resolution of the displays 208.

Read timing (display timing) from the virtual display buffer 206, and in addition, the position and size of display areas may be determined via the user operation unit 211. In this case, the number of displays 208 for displaying images may be determined via the user operation unit 211. Note that a plurality of displays 208 should be prepared to do so, although FIG. 1 shows only one displays 208.

Figure 23:
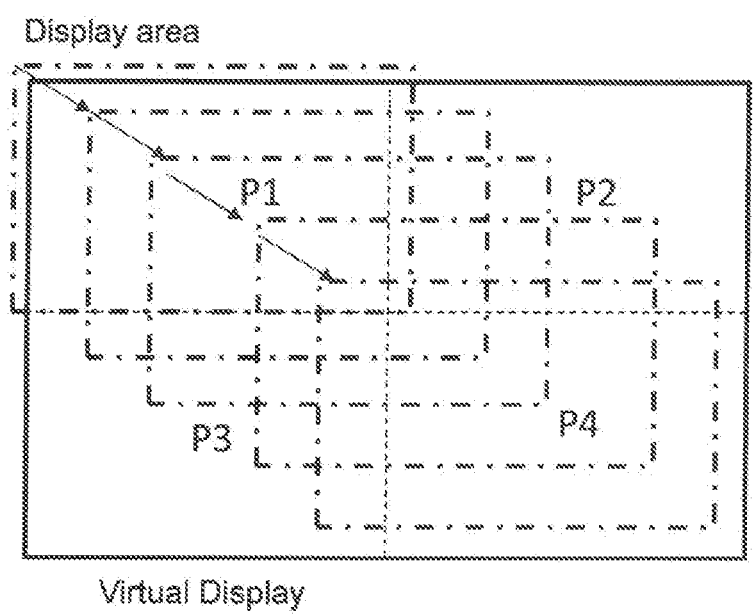
FIG. 23 A diagram showing an example of a relation between display areas and images on a virtual display.

FIG. 23 shows an example of a relation between display areas and images on a virtual display. In the example of FIG. 23, a group picture containing 2×2 images P1 to P4 is in the horizontal/vertical two-dimensional multi-image arrangement. The size of the display area in the virtual display is set based on user-operation, and the position of the display area may be changed based on user-operation as necessary, as shown in FIG. 23. In this case, only the image corresponding to the display area is displayed on the displays 208 out of the images P1 to P4 on the virtual display.

Note that, in this case, under control of the CPU 210, the position and the size of the current display area on the virtual display may be displayed on the displays 208 or a not-shown different display device. Thanks to this display, a user may know the position and the size of the display area on the virtual display easily, and may determine the position and the size of the display area appropriately and effectively.

Figure 24:
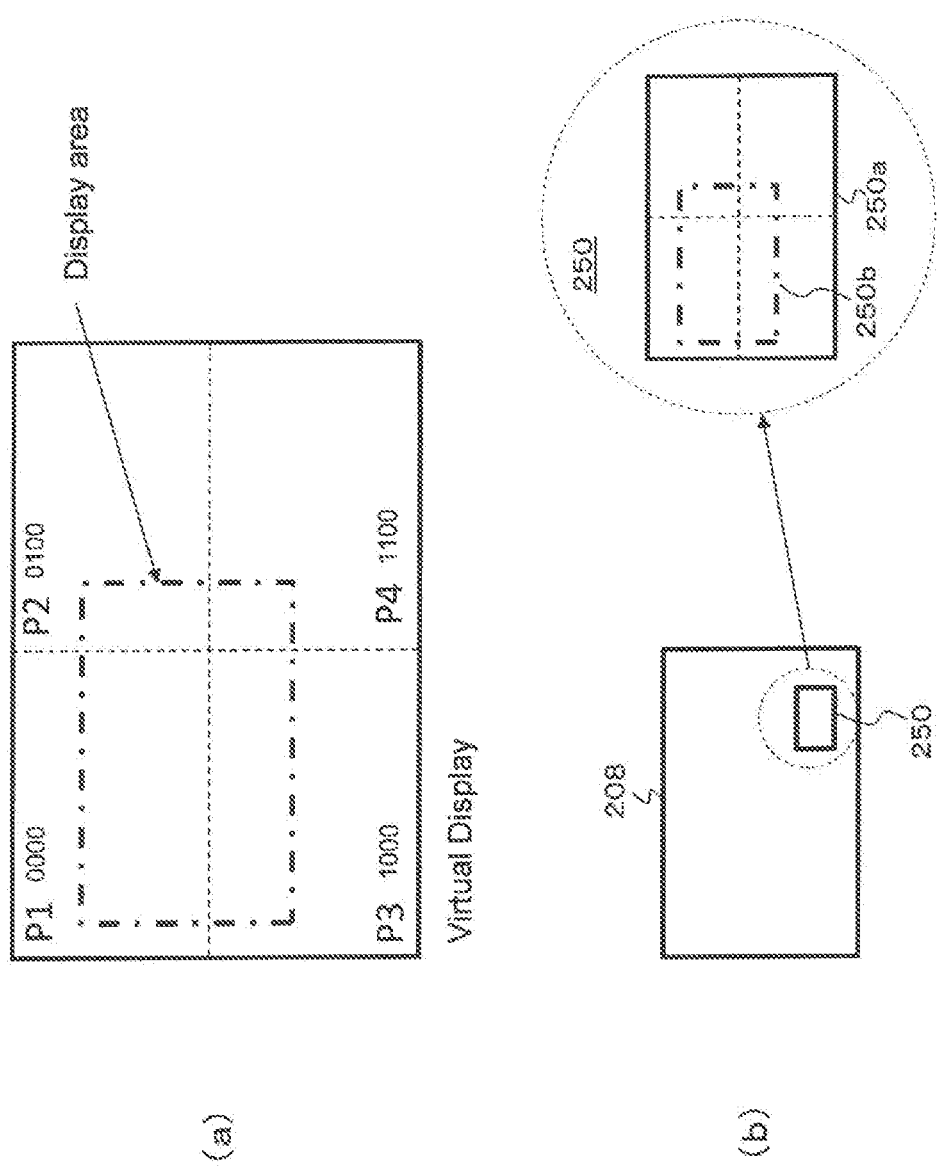
FIG. 24 A diagram showing an example of the position and the size of the display area on the virtual display.

FIG. 24(a) shows an example of the position and the size of the display area on the virtual display. FIG. 24(b) shows an example of the position indicator 250 displayed on the displays 208 corresponding thereto. The position indicator 250 includes the diagram 250a showing the entire virtual display, and the rectangular diagram 250b showing the current display area, which is arranged on that diagram corresponding to the position and the size of the display area.

Figure 25:
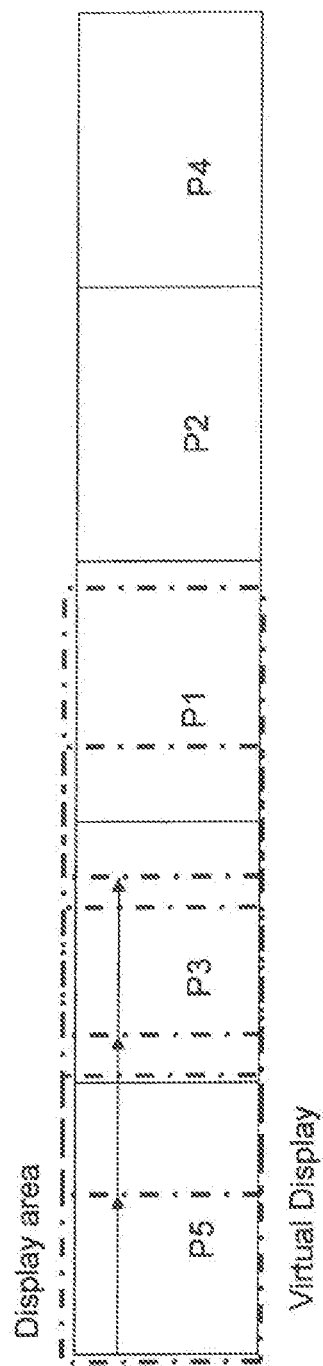
FIG. 25 A diagram showing an example of a relation between the display area and the image on the virtual display.

Further, FIG. 25 shows an example of a relation between the display area and the image on the virtual display. In the example of FIG. 25, a group picture containing five images P1 to P5 is in the horizontal one-dimensional multi-image arrangement. The size of the display area in the virtual display is set based on user-operation, and the position of the display area may be changed based on user-operation as necessary, as shown in FIG. 25. In this case, only the image corresponding to the display area is displayed on the displays 208 out of the images P1 to P5 on the virtual display.

Figure 26:
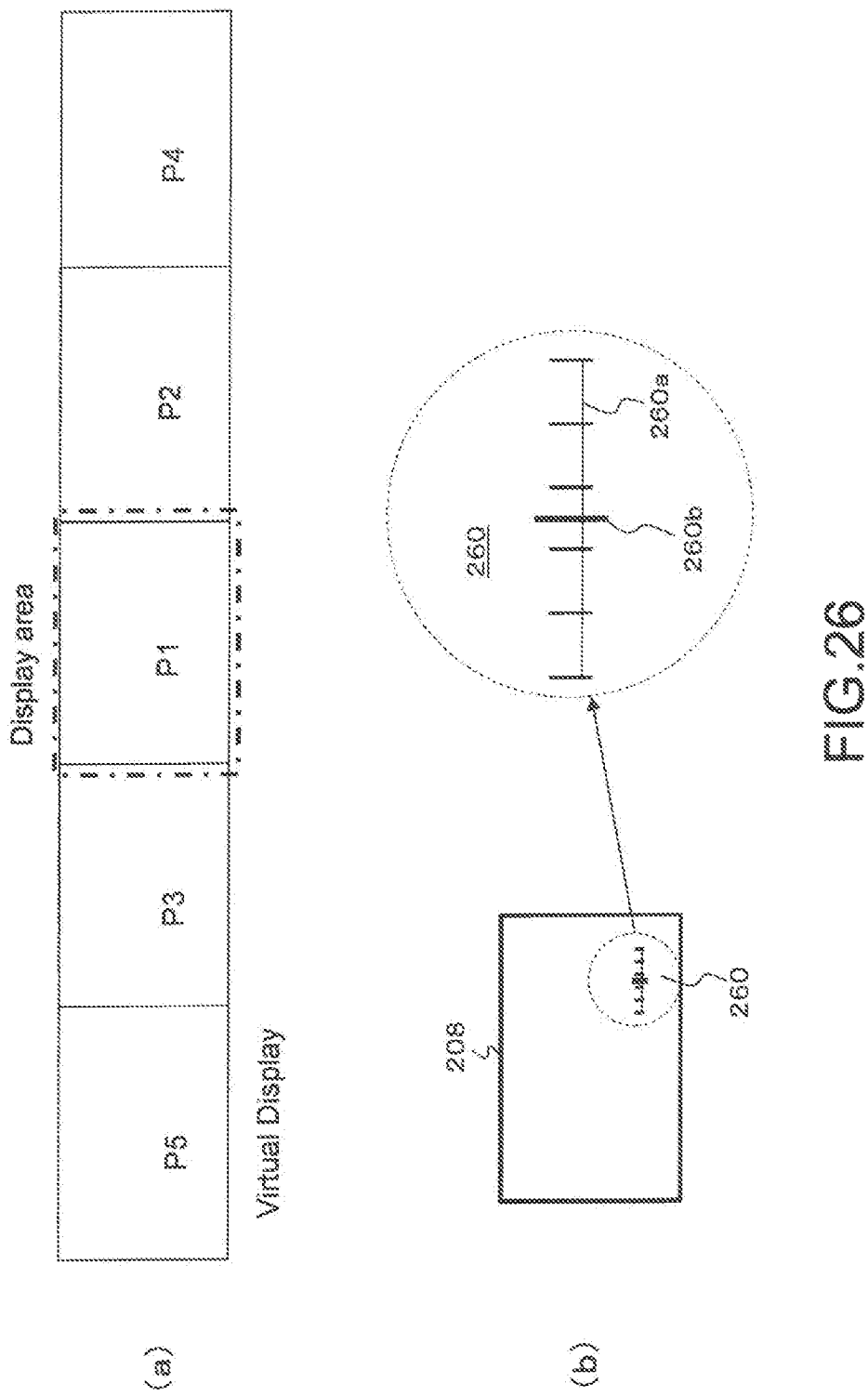
FIG. 26 A diagram showing an example of the position and the size of the display area on the virtual display.

FIG. 26(a) shows an example of the position and the size of the display area on the virtual display. FIG. 26(b) shows an example of the position indicator 260 displayed on the displays 208 corresponding thereto. The position indicator 260 includes the diagram 260a showing the entire virtual display, and the bar diagram 260b showing the center position of the current display area, which is arranged on that diagram corresponding to the center position of the display area. Also in this case, the position and the size of the display area may be shown by using a rectangular diagram.

Figure 27:
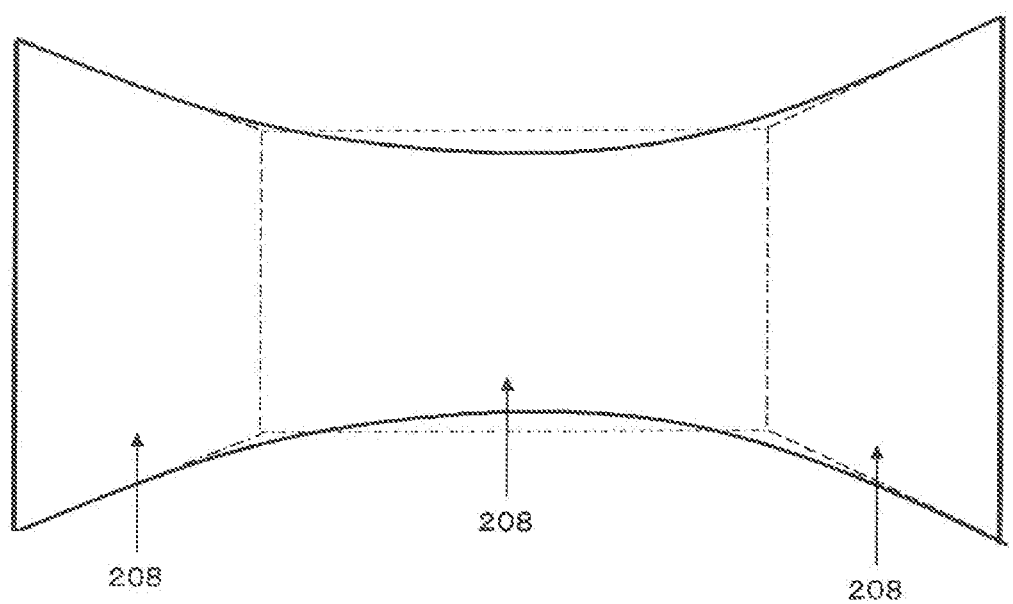
FIG. 27 A diagram showing a structural example of displays for displaying a panoramic image.

FIG. 27 shows a structural example of displays for displaying a panoramic image. This display is structured by connecting a plurality of, i.e., three in this example, flat (shown in dashed-dotted lines) or curved (shown in solid lines) displays 208 in the horizontal direction. In this case, for example, three continuing images are selectively displayed in the horizontal direction on the three displays 208, and a panoramic image is thus displayed.

Figure 28:
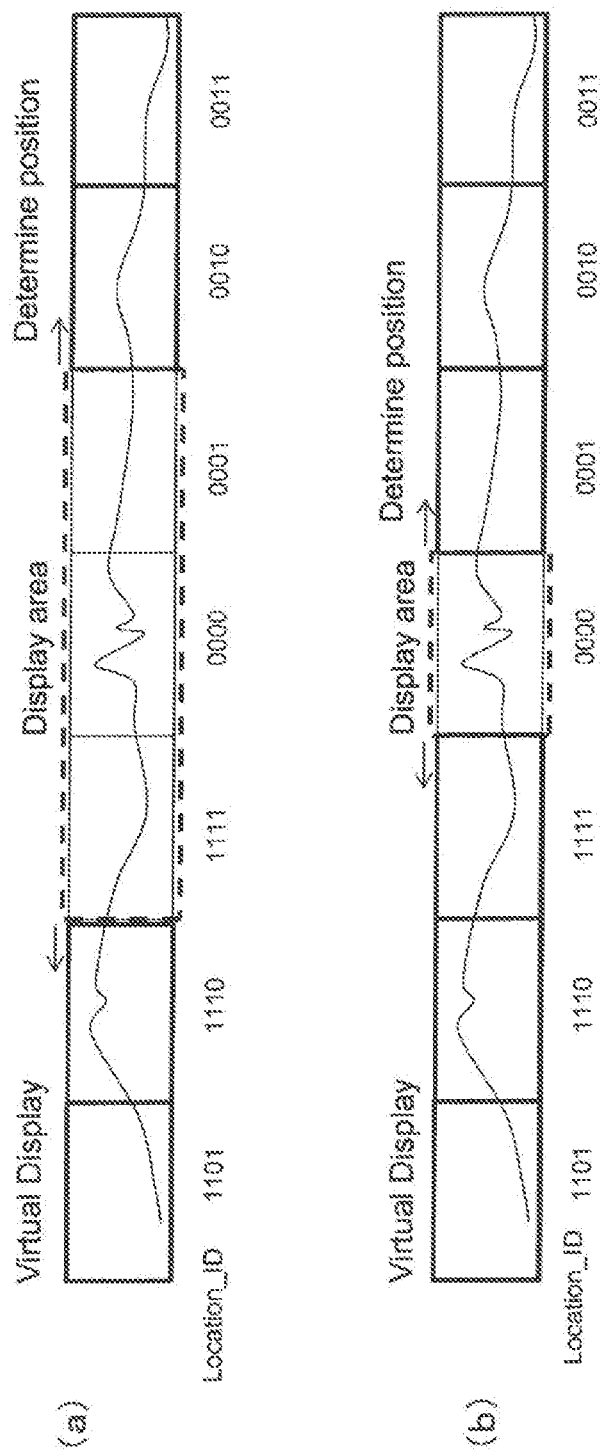
FIG. 28 Diagrams each showing an example of determining a display area when a group picture contains seven images continuous in the horizontal direction.

FIG. 28 shows examples of determining a display area when a group picture contains seven images continuous in the horizontal direction. FIG. 28(a) shows an example of determining a position of a display area having the size of, for example, three images, which is used to display part of a panoramic image on the three displays 208 (for example, see FIG. 27). FIG. 28(b) shows an example of determining a position of a display area having the size of, for example, one image, which is used to display part of a panoramic image on the one display 208.

With reference to FIG. 1 again, if the images in a group picture are still images, the still images are updated based on user-operation. In this case, image data of images-to-be-updated is read from the virtual display buffer 206 based on "location_id" and "version_number", and the displayed images are updated.

For example, the above-mentioned distribution example of FIG. 18 will be considered. Let's say, in this case, firstly, image data of the four images having "1" as "version_number" and "1" to "4" as "location_id" is read from the virtual display buffer 206, and a group picture containing still images is displayed. In this situation, if a user inputs update operation, image data of an image having "2" as "version_number" and "2" as "location_id" is read from the virtual display buffer 206, and the displayed image is updated.

Further, in this situation, if a user inputs update operation, image data of an image having "3" as "version_number" and "2" as "location_id" is read from the virtual display buffer 206, and the displayed image is updated again. Further, in this situation, if a user inputs update operation, image data of four images having "4" as "version_number" and "1" to "4" as "location_id" is read from the virtual display buffer 206, and the four displayed images are updated.

If images in a group picture are still images, and if "0" is set as "lifetime controlled" even after image data is read from the virtual display buffer 206 and displayed on the displays 208, the image data is remained in the virtual display buffer 206 until a user inputs a release instruction. Meanwhile, if "1" is set as "lifetime controlled", after the NIP time determined in a system layer (container layer) passes, image data of the corresponding group picture is automatically deleted from the virtual display buffer 206.

If part or all of a plurality of images in a group picture are moving images, the image data of the moving image is read from the uncompressed data buffer 205 into the virtual display buffer 206 at timing depending on the PTS, after that, is read within a predetermined time period, and is transmitted to the displays 208 via the scaler 207. Also in, this case, only image data of the display area, whose size and position are determined by a user, is read as necessary, and the scaler 207 converts the size (converts resolution).

Further, a user inputs an image-rotation operation via the user operation unit 211, and the displayed images on the displays 208, i.e., the whole group picture or images in the group picture, may thus be rotated. Note that rotation of the images is controlled basically based on the information "display_coordinate". As a result, it is possible to display images in the rotation status that the service side wants to provide. However, it is possible to further rotate images based on operation by a user.

Further, a user may operate the user operation unit 211 to transmit a reproduction command, in addition, a pause command, a resume command, a skip command, a reproduction-end command, and the like to the network distribution server 120. Further, for example, before the virtual display buffer 206 overflows, the CPU 210, for example, automatically transmits a pause command to the network distribution server 120, and, after that, transmits a resume command if the virtual display buffer 206 has an enough remaining capacity.

The behaviors of the receiver 200 will be roughly described. Firstly the receiver 200 receiving broadcast waves will be described. The tuner 201 receives the still-image linear service and the moving-image linear service, and obtains a transport stream (broadcast-distributive multiplexed data). The transport stream is transmitted to the demultiplexer 202.

The demultiplexer 202 extracts a predetermined number of video streams from the transport stream (broadcast-distributive multiplexed data), and temporarily stores the video streams in the compressed data buffer 203. At this time, the demultiplexer 202 extracts various information inserted in a container layer, and transmits the information to the CPU 210. Note that the demultiplexer 202 processes a recorded/reproduced transport stream (broadcast-distributive multiplexed data) of the storage medium 212 in the similar manner.

The decoder 204 fetches a predetermined number of video streams stored in the compressed data buffer 203 at predetermined decoding-timing, decodes the video streams, obtains image data of the images in a group picture (multi-image-arranged image), and temporarily stores the image data in the uncompressed data buffer 205. At this time, the decoder 204 extracts various information inserted in a video-stream layer, and transmits the information to the CPU 210.

The virtual display buffer 206 obtains image data of the images in the group picture stored in the uncompressed data buffer 205, and temporarily stores the image data in areas corresponding to the images, respectively. Data is read from the uncompressed data buffer 205 to the virtual display buffer 206 at timing depending on PTS (Presentation Time Stamp), for example.

As described above, out of image data of the images in a group picture stored in the virtual display buffer 206, an area, whose position and size are determined by a user, is read at arbitrary timing, the scaler 207 converts the size (resolution), and, after that, it is transmitted to the displays 208. As a result, the display area, which is determined by the user, out of the group picture is displayed on the displays 208.

In this case, moving image data of the linear service is displayed after a delay of a fixed time after receiving the service. Meanwhile, since the degree of freedom of viewing time of the still-image service is larger depending on preference of users, a user inputs instructions to update displayed content on an irregular basis. Because of this, the amount of delay of the receiver 200 is not constant irrespective of the display time period.

The virtual display buffer 206 absorbs a difference between the delay time and previously encoded and distributed timing of the received stream. In the linear service, before the virtual display buffer 206 overflows, the receiver 200 determines to record the received stream in the storage medium 212, to suspend receiving of the service, or the like.

Further, when the receiver 200 receives the download service of moving images or still images via broadcast waves, files obtained via the tuner 201 are once stored in the storage medium 212, or the demultiplexer 202 stores the files in the storage medium 212 and the decoder 204 decodes the files simultaneously, the virtual display buffer 206 generates a group picture, and the group pip picture is displayed.

Next, how the receiver 200 receives network distribution will be described. The gateway/network router 209 receives the still-image linear service and the moving-image linear service, and obtains MP4 (IP distribution data). The MP4 is transmitted to the demultiplexer 202.

The demultiplexer 202 extracts a predetermined number of video streams from the MP4 (IP distribution data), and the MP4 is temporarily stored in the compressed data buffer 203. At this time, the demultiplexer 202 extracts various information inserted in a container layer, and transmits the information to the CPU 210. Note that the demultiplexer 202 processes recorded/reproduced MP4 (IP distribution data) of the storage medium 212 in the similar manner.

The decoder 204 fetches a predetermined number of video streams stored, in the compressed data buffer 203 at predetermined decoding-timing, decodes the video streams, obtains image data of the images in a group picture multi-image-arranged image), and temporarily stores the image data in the uncompressed data buffer 205. At this time, the decoder 204 extracts various information inserted in a video-stream layer, and transmits the information to the CPU 210.

The virtual display buffer 206 obtains image data of the images in the group picture stored in the uncompressed data buffer 205, and temporarily stores the image data in areas corresponding to the images, respectively Data is read from the uncompressed data buffer 205 to the virtual display buffer 206 at timing depending on PTS (Presentation Time Stamp), for example.

As described above, out of image data of the images in a group picture stored in the virtual display buffer 206, an area, whose position and size are determined by a user, is read at arbitrary timing, the scaler 207 converts the size (resolution), and, after that, it is transmitted to the displays 208. As a result, the display area, which is determined by the user, out of the group picture is displayed on the displays 208.

In this case, moving image data of the linear service is displayed after a delay of a fixed time after receiving the service. Meanwhile, since the degree of freedom of viewing time of the still-image service is larger depending on preference of users, a user inputs instructions to update displayed content on an irregular basis. Because of this, the amount of delay of the receiver 200 is not constant irrespective of the display time period.

The virtual display buffer 206 absorbs a difference between the delay time and previously encoded and distributed timing of the received stream. In the linear service (multicast), before the virtual display buffer 206 overflows, the receiver 200 determines to record the received stream in the storage medium 212, to suspend receiving of the service, or the like. Alternatively, the receiver 200 starts VOD (unicast service) immediately, and transmits reproduction-control commands (reproduce start, pause, resume, stop, and the like) to a VOD distribution server.

When the receiver 200 receives the download service of moving images or still images via network distribution, files obtained via the gateway/network router 209 are once stored in the storage medium 212, or the demultiplexer 202 stores the files in the storage medium 212 and the decoder 204 decodes the files simultaneously, the virtual display buffer 206 generates a group picture, and the group picture is displayed.

At this time, the receiver 200 suspends receiving download before the virtual display buffer 206 overflows, and sets the receiver so as to resume download later. Similar to receiving of the linear service, if the virtual display buffer 206 cannot absorb the network distribution service, the storage medium 212 absorbs instead, or the receiver 200 starts VOD (unicast service) and transmits reproduction-control commands (reproduce start, pause, resume, stop, and the like) to the VOD distribution server.

As described above, according to the distribution system 10 of FIG. 1, when transmitting, via an RF transmission path or a communication network to a receiving side, a container of a predetermined format containing a predetermined number of video streams containing encoded image data of a plurality of images of a multi-image-arrangement distribution service, position information (location_id) showing arrangement positions of a plurality of images is inserted in a video-stream layer. As a result, for example, the receiving side is capable of arranging a plurality of images in a group picture (multi-image-arranged image) effectively and appropriately.

Further according to the distribution system 10 of FIG. 1, the receiver 200 arranges image data of a plurality of images in a decoded group picture based on position information, and obtains image data of the group picture. As a result, for example, it is possible to obtain image data of a group picture effectively and appropriately.

2. Modification Example

Figure 29:
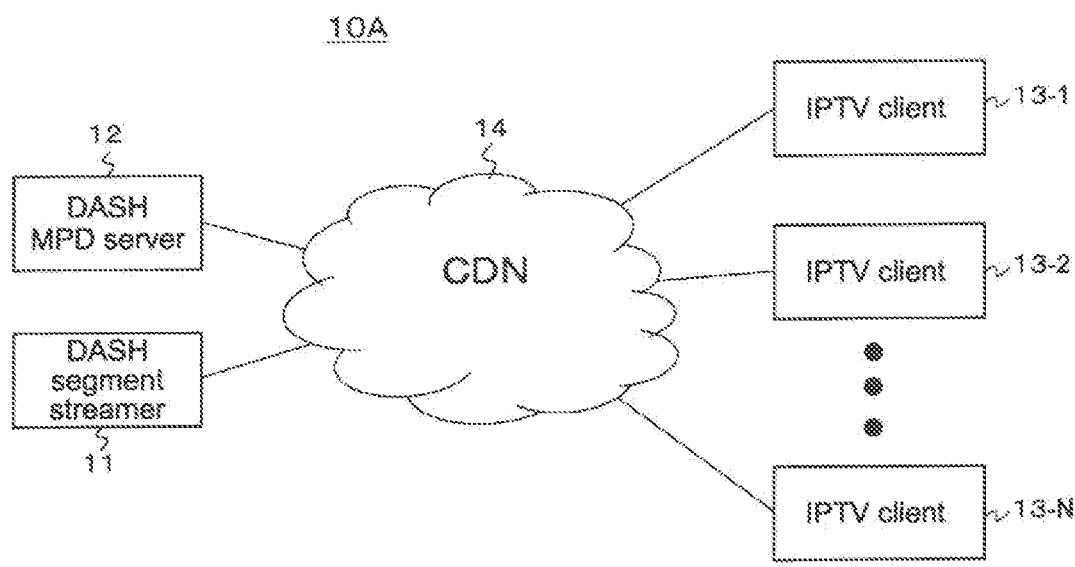
FIG. 29 A block diagram showing a structural example of a stream distribution system based on DASH.

Note that the present technology is applicable to a distribution system based on MPEG-DASH. FIG. 29 shows a structural example of the distribution system 10A based on MPEG-DASH. In the distribution system 10A, the N number of IPTV clients 13-1, 13-2, . . . , 13-N are connected to the DASH segment streamer 11 and the DASH MPD server 12 via the CDN (Content Delivery Network) 14.

The DASH segment streamer 11 generates a DASH-based stream segment (hereinafter referred to as "DASH segment") based on media data (video data, audio data, subtitle data, and the like) of predetermined content, and transmits the segments in response to an HTTP request from an IPTV client. The DASH segment streamer 11 is a web server.

Further, in response to a request for a segment of a predetermined stream transmitted from the IPTV client 13 (13-1, 13-2, . . . , 13-N) via the CDN 14, the DASH segment streamer 1 transmits the segment of the stream to the IPTV client 13, which has sent the request, via the CON 14.

The DASH MPD server 12 is a server that generates an MPD file, which is used to obtain the DASH segment generated by the DASH segment streamer 11. The DASH MPD server 12 generates an MPD file based on content metadata from a content management server (not shown in FIG. 29) and based on an address (url) of the segment generated by the DASH segment streamer 11.

According to the MPD format, attributes of video, audio, and other streams are described by using elements called representation. For example, an MPD file is divided into representations each containing a predetermined number of video streams containing encoded data of a plurality of images of the multi-image-arrangement distribution service, and the attributes are described. Further, in an MPD file, information to constantly read the predetermined number of video streams is described. If the IPTV client 13 receives the multi-image-arrangement distribution service, the IPTV client 13 obtains a predetermined number of video streams with reference to the description of the MPD file.

Figure 30:
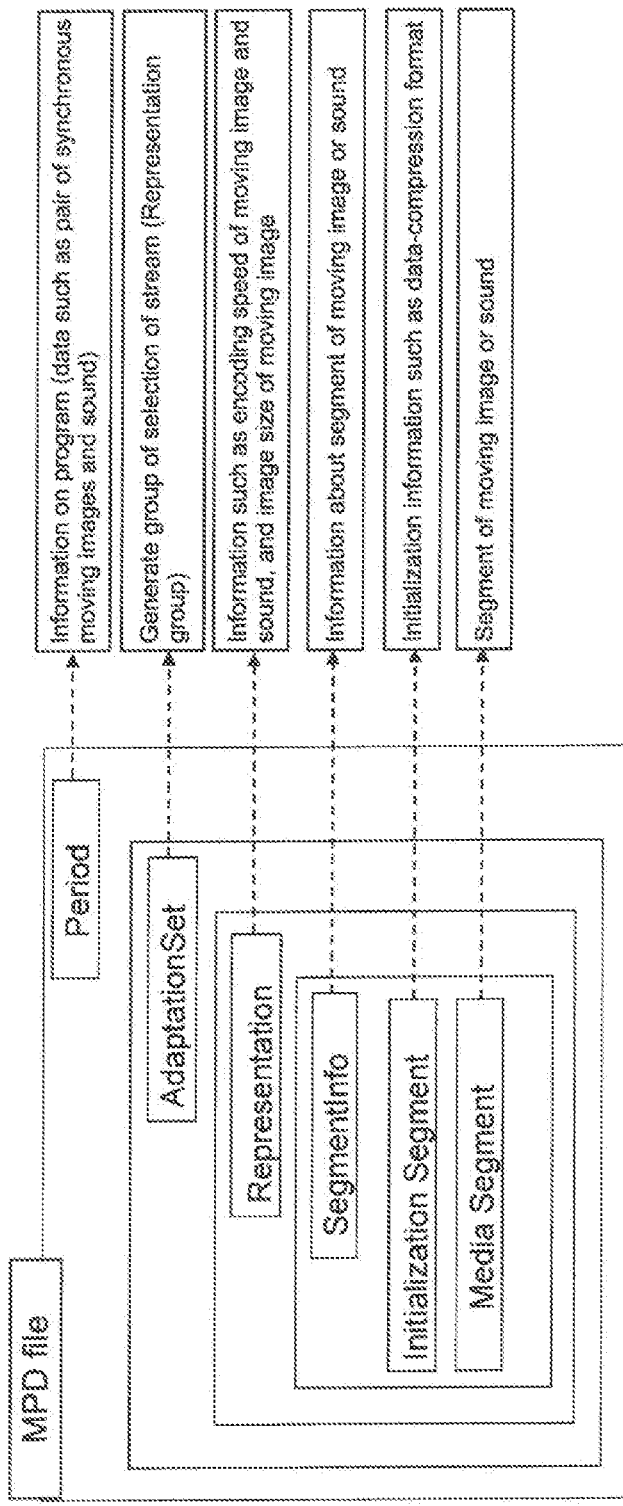
FIG. 30 A diagram showing a layer structure of an MPD file.

As shown in FIG. 30, the MPD file has a layer structure. In the MPD file, information such as the compression format, the encoding speed, the image size, and the language of a moving image stored in the DASH segment streamer 11 is described in a layered manner by using the XML format. The MPD file contains, in a layered manner, structures such as period, adaptation set, representation, segment info, initialization segment, and media segment.

A period structure contains information on a program (data such as pair of synchronous moving images and sound). Further, an adaptation-set structure in the period structure generates a group of selection of a stream (representation group). Further, a representation structure in the adaptation-set structure, holds information such as the encoding speed of a moving image and a sound, and the sound volume of the moving image.

Further, a segment-info structure in the representation structure holds information about a segment of a moving image or sound. Further, an initialization-segment structure in the segment-info structure holds initialization information such as a data-compression format. Further, a media-segment structure in the segment-into structure holds information such as an address, which is used to obtain the segment of a moving image or sound.

Figure 31:
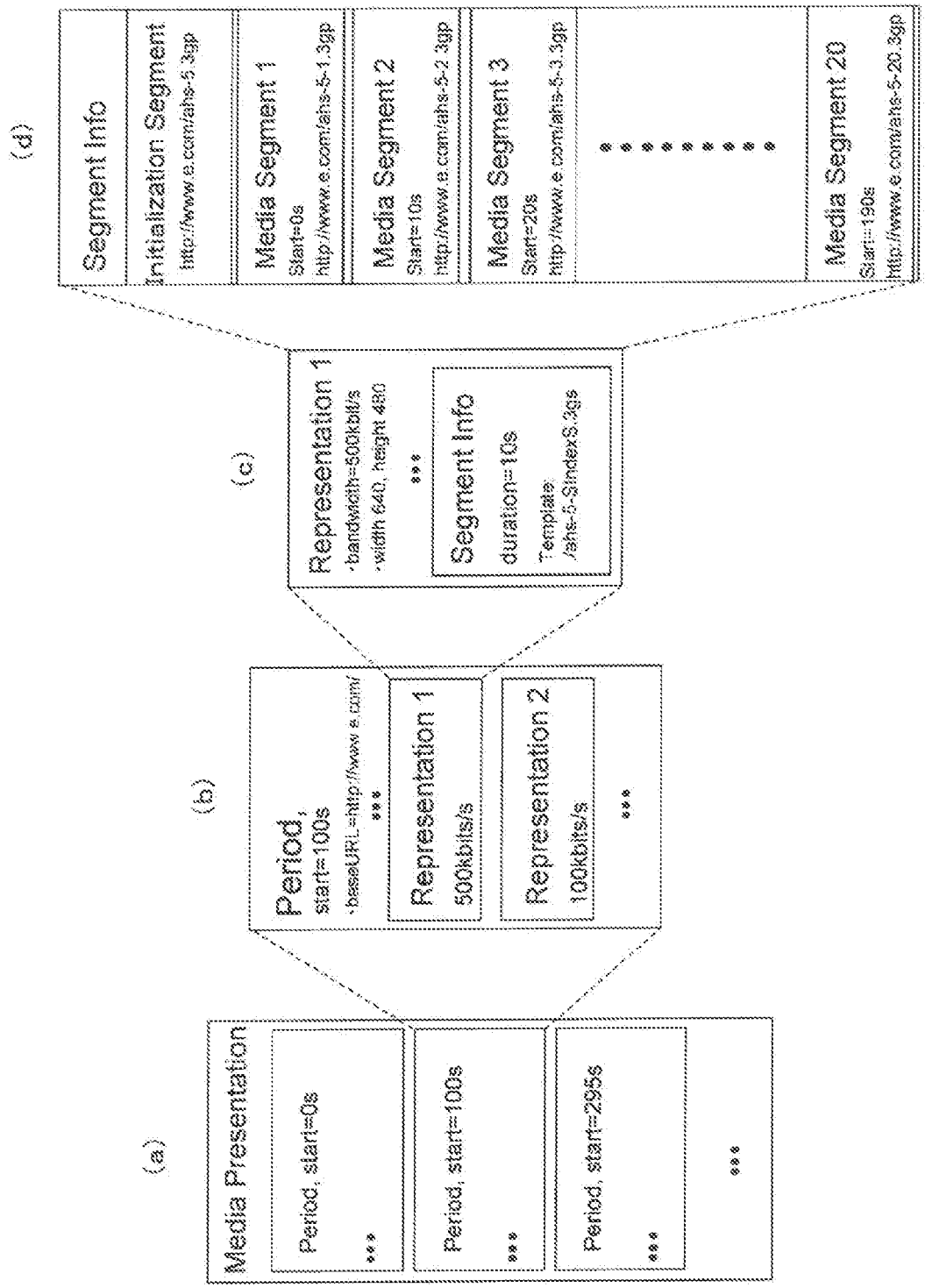
FIG. 31 A diagram showing an example of the relation of the structures, which are arranged in a layered manner in the MPD file.

FIG. 31 shows an example of the relation of the structures, which are arranged in a layered manner in the above-mentioned MPD file. As shown in FIG. 31(a), the media presentation, i.e., the entire MPD file, contains a plurality of periods divided based on rime intervals. For example, the first period starts at 0 second, the next period starts at 100 seconds, and the like.

As shown in FIG. 31(b), a period contains a plurality of representations. The plurality of representations are divided into groups based on the adaptation set, i.e., representation groups each containing a predetermined number of video streams containing encoded data of a plurality of images of the multi-image-arrangement distribution service, for example.

As shown in FIG. 31(c), a representation contains segment info. As shown in FIG. 31(d), the segment info contains an initialization segment and a plurality of media segments, in each of which information on each segment is described, the segment being obtained by further dividing a period into smaller pieces. The media segment contains information such as an address (url), which is used to obtain a video or audio segment data or the like actually.

Figure 32:
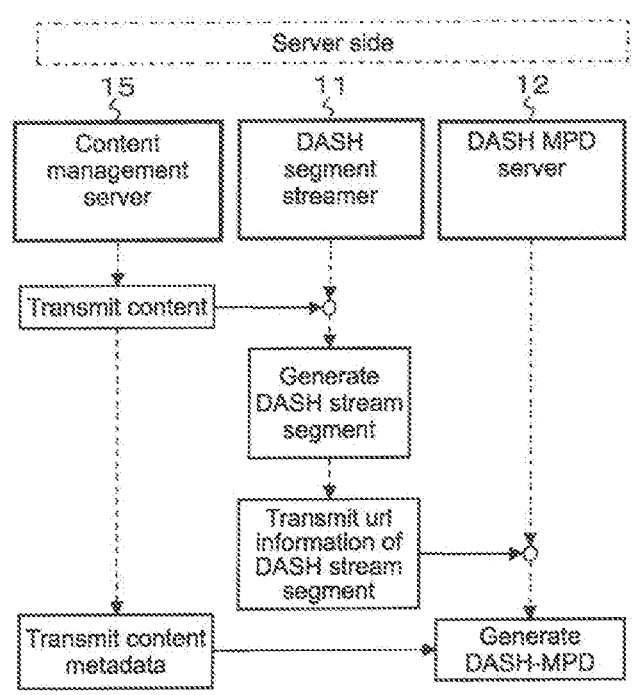
FIG. 32 A diagram showing an example of a flow of generating a DASH segment and a DASH MPD file based on content.

FIG. 32 shows an example of a flow of generating a DASH segment and a DASH MPD file based on content. The content management server 15 transmits content to the DASH segment streamer 11. The DASH segment streamer 11 generates a DASH segment of each data stream based on video data, audio data, and the like of the content.

Further, the DASH segment streamer 11 transmits information, on the address (url) of the DASH segment of each generated data stream to the DASH MPD server 12. The content management server 15 transmits the metadata of the content to the DASH MPD server 12. The DASH MPD server 12 generates a DASH M-D file based on the address information of the DASH segment of each data stream and based on the metadata of the content.

Figure 33:
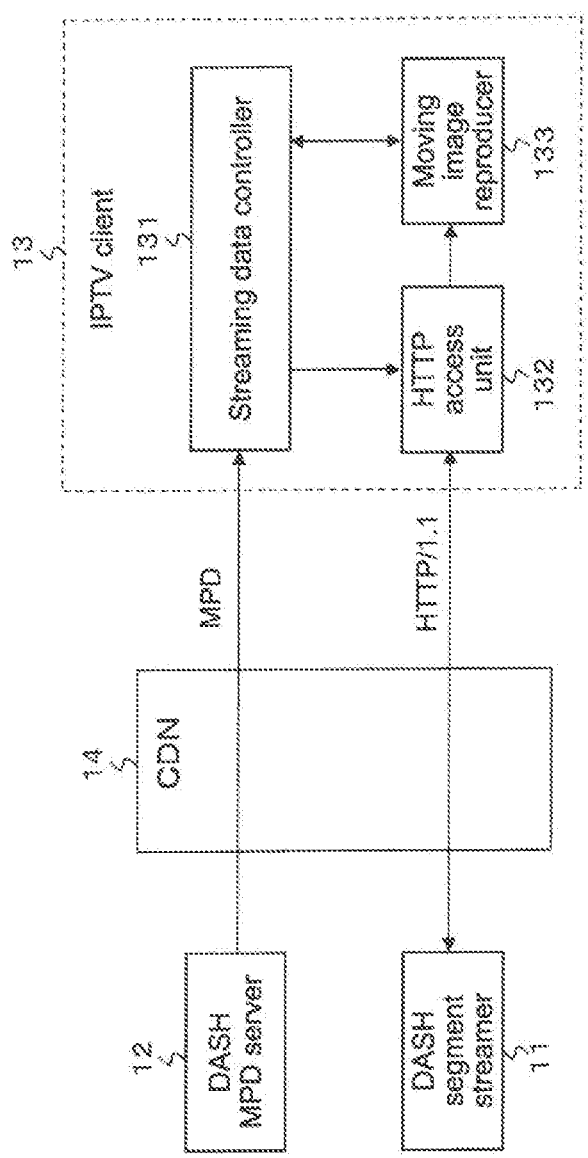
FIG. 33 A diagram showing a structural example of an IPTV client of the stream distribution system.

FIG. 33 shows a structural example of the IPTV client 13 (13-1 to 13-N). The IPTV client 13 includes the streaming data controller 131, the HTTP access unit 132, and the moving image reproducer 133. The streaming data controller 131 obtains an MPD file from the DASH MPD server 12, and analyzes the content of the MPD file.

The HTTP access unit 132 requests the DASH segment streamer 11 to transmit a segment of a moving image or sound used to reproduce a moving image. Here, if the HTTP access unit 132 receives the multi-image-arrangement distribution service, the HTTP access unit 132 requests, with reference to the description of the MPD file, to transmit a segment of a predetermined number of video streams containing encoded data of a plurality of images of the multi-image-arrangement distribution service.

The HTTP access unit 132 transmits the received segment of a moving image or sound to the moving image reproducer 133. The moving image reproducer 133 decodes segments transmitted from the HTTP access unit 132, obtains image data of images in a group picture (multi-image-arranged image), sound data in association with the image data, and the like, and reproduces images and sound. Note that the units of the IPTV client 13 is processed by using software, for example.

Figure 34:
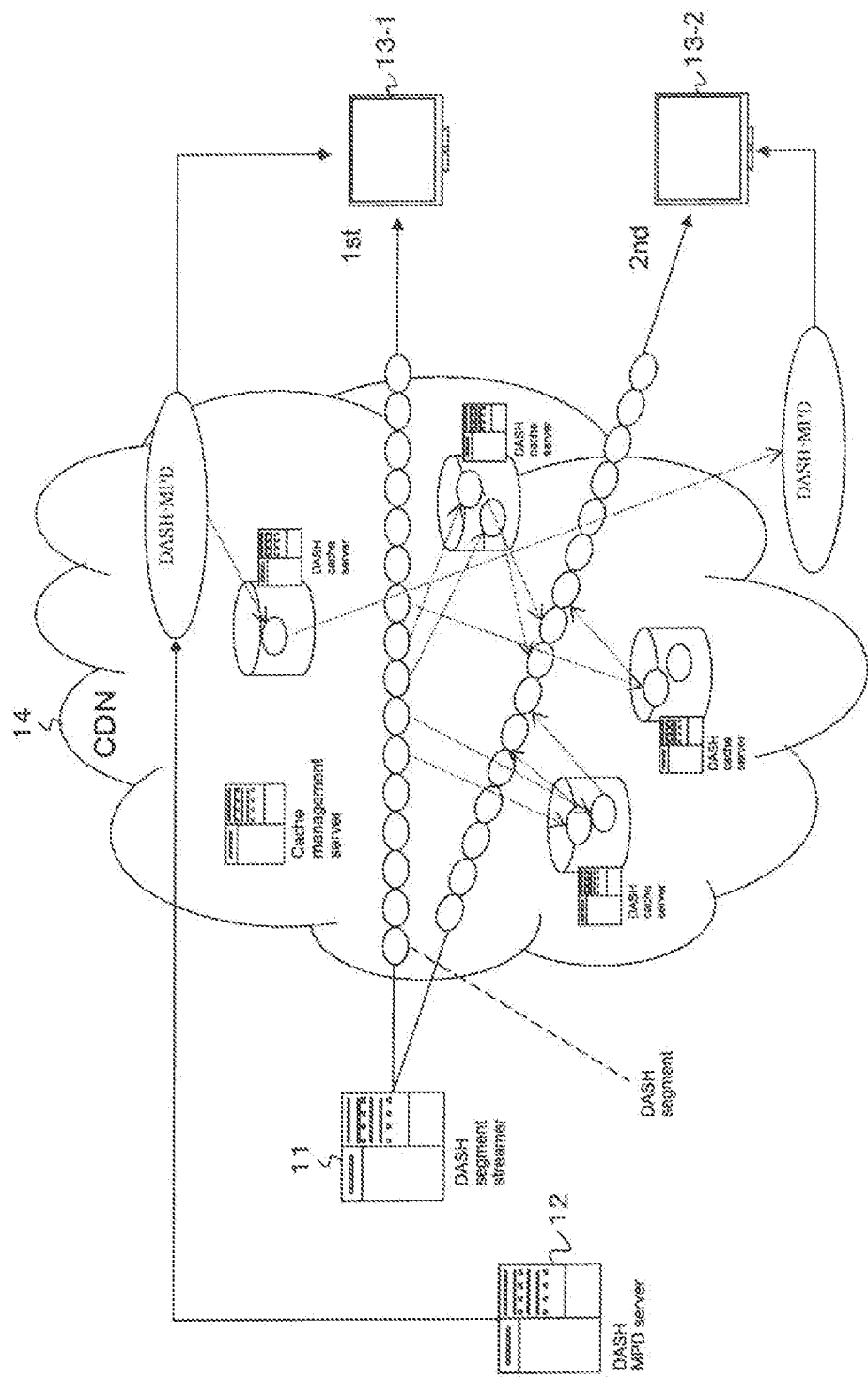
FIG. 34 A diagram showing a general stream-distribution-system series based on DASH.

FIG. 34 shows a general stream-distribution-system series based on DASH. All the DASH MPD files and DASH segments are distributed via the CDN (Content Delivery Network) 14. In the CDN 14, a plurality of cache servers (DASH cache servers) have a network arrangement.

The cache server receives an HTTP request from the IPTV client 13 to obtain MPD files. If the cache server has MPD files in a local MPD cache, the cache server returns an HTTP response to the IPTV client 13. Further, if the cache server does not have MPD files in the local MPD cache, the cache server transfers the request to the DASH. MPD server 12 or an upper cache server. Further, the cache server receives an HTTP response, which means that the MPD files are stored, transfers the HTTP response to the IPTV client 13, and caches the MPD files.

Further, the cache server receives an HTTP request from the IPTV client 13 to obtain DASH segments. If the cache server has DASH segments in a local segment cache, the cache server returns an HTTP response to the IPTV client 13. Further, if the cache server does not have DASH segments in the local segment cache, the cache server transfers the request to the DASH segment streamer 11 or an upper cache server. Further, the cache server receives an HTTP response, which means that the DASH segments are stored, transfers the HTTP response to the IPTV client 13, and caches the DASH segments.

In the CDN 14, an IPTV client 13-1 transmits an HTTP request firstly, the cache server on the route temporarily caches DASH segments to be distributed to the IPTV client 13-1, and the cached DASH segments are distributed to a downstream IPTV client 13-2 in response to an HTTP request. As a result, it is possible to increase the distribution efficiency of HTTP streaming to a large number of IPTV clients.

The CDN 14 includes, in addition to a plurality of cache servers, a predetermined number of cache management servers. The cache management server generates a cache control policy based on an index of the cache of the DASH segment of each video data stream in an MPD file, and distributes the cache control policy to each cache server. Each cache server caches the DASH segment of each video data stream based on the cache control policy.

Figure 35:
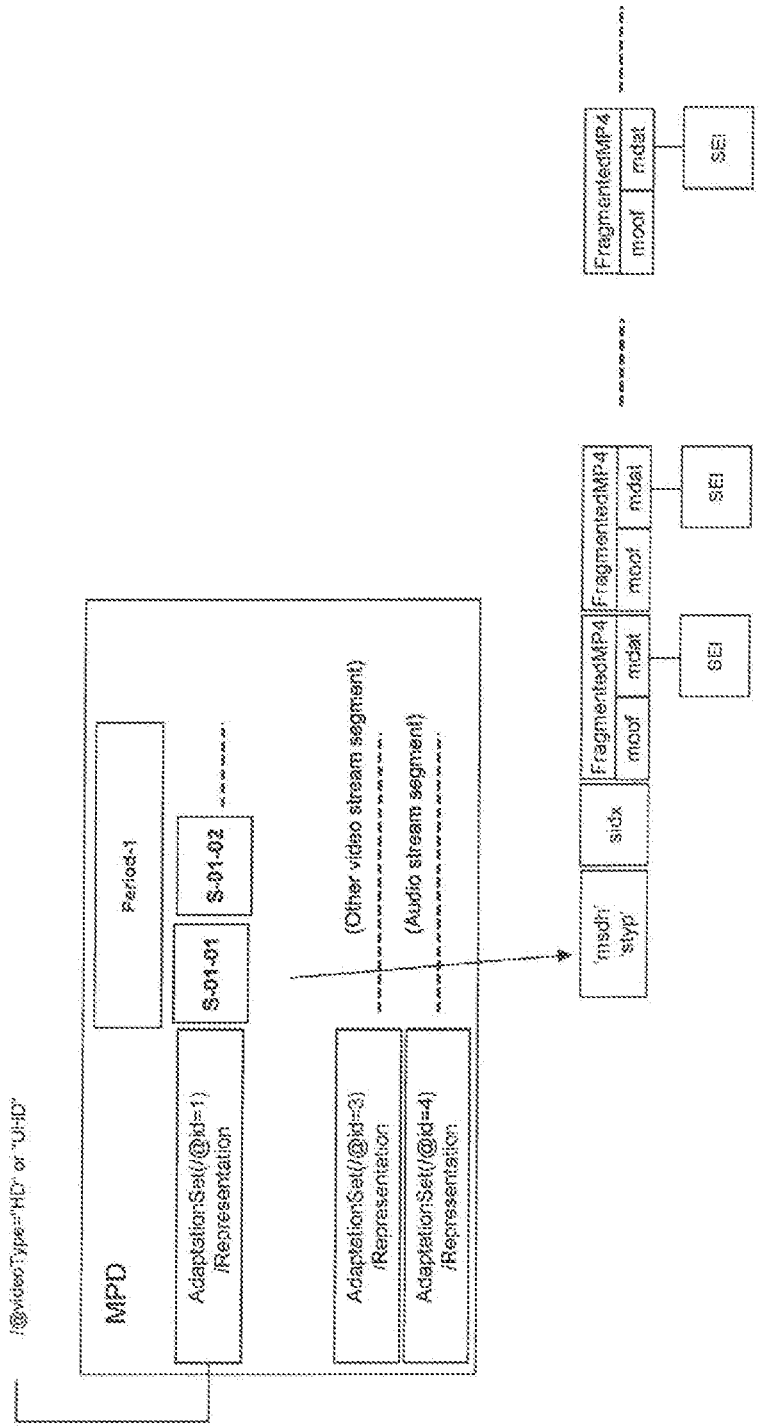
FIG. 35 A diagram showing a structural example of Fragmented MP4 stream containing a video stream.

FIG. 35 shows a structural example of Fragmented MP4 stream. Fragmented MP4 stream of a video contains Fragmented MP4s, which are obtained by packeting a video stream. A predetermined pictures of a video stream is inserted in "mdat" section of Fragmented MP4. Similar to the above-mentioned embodiment, a group picture tag SEI (Group_picture_tag SEI) message is inserted in each access unit of the video stream. Further, similar to the above-mentioned embodiment, for example, the IPTV client 13 arranges images effectively and appropriately based on position information ("location_id") on the images in a group picture.

Note that, sometimes, a transport stream is transmitted as it is based on DASH. In this case, a transport stream, in which a multi-stream-service descriptor (multi_stream_service_descriptor), a mixed stream descriptor (mixed_stream_descriptor), and a picture lifetime descriptor (Picture_lifetime_descriptor) are inserted, is transmitted as it is.

Figure 37:
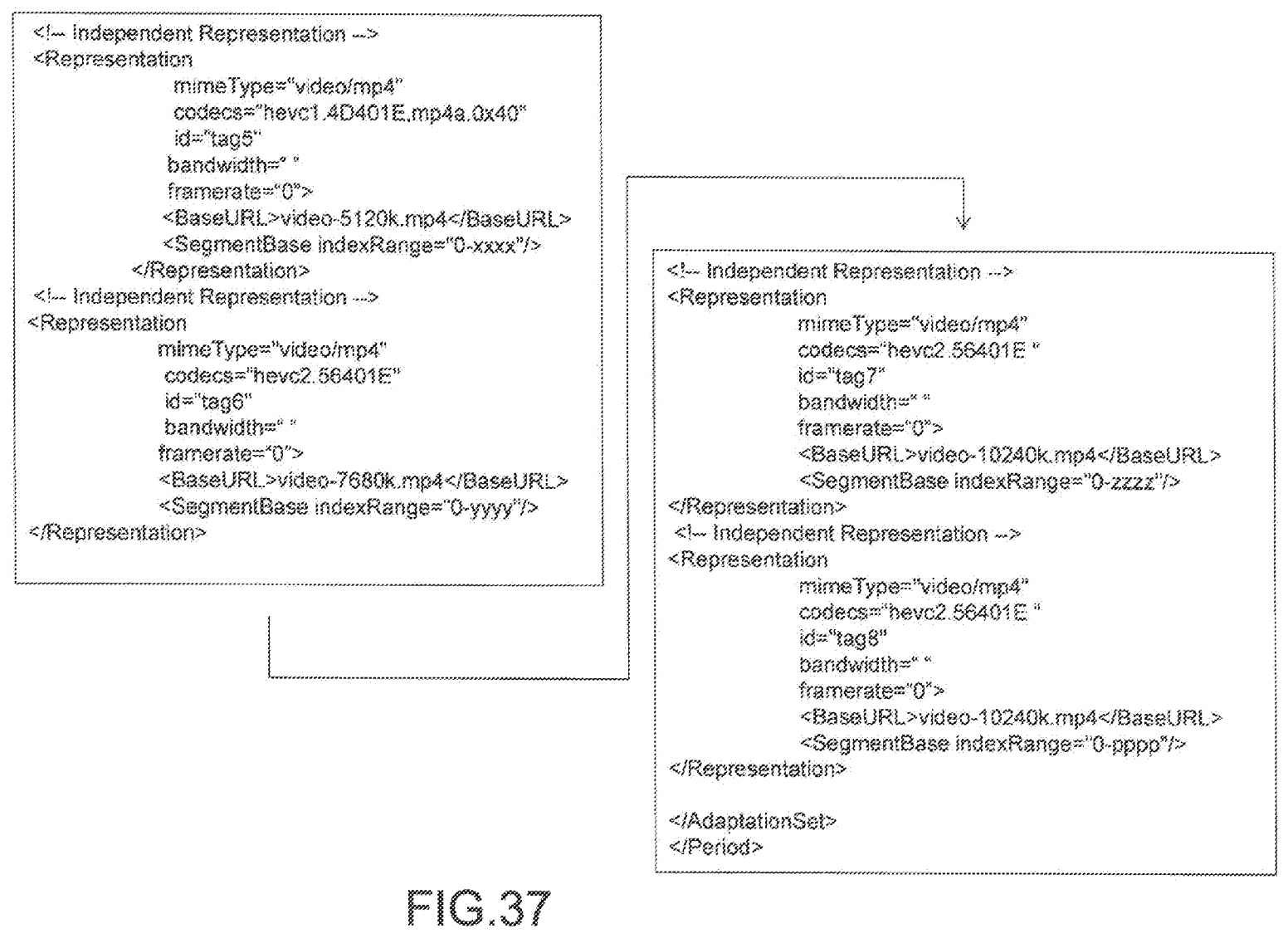

Each of FIG. 36 and FIG. 37 shows a description example of an MPD file of the multi-image-arrangement distribution service. In the "Adaptation Set" layer of FIG. 36, the description "parallelStream="4"" means to read four streams constantly. Further, the description "frameRate="0"" means that the fame rate is 0, i.e., a still-image stream. Further, as shown in FIG. 37, there are four representations corresponding to the four streams.

As described above, in the multi-image-arrangement distribution service, to constantly read a predetermined number of video streams, which contain encoded data of a plurality of images of the multi-image-arrangement distribution service, is described in an MPD file. As a result, the IPTV client 13 is capable of obtaining image data of the images in a group picture, i.e., the images of the group picture, successfully.

Further, the present technology may employ the following structures.

(1) A transmission device, including:

a transmitting unit that transmits a container of a predetermined format containing a predetermined number of video streams containing encoded image data of a plurality of images of a multi-image-arrangement distribution service; and an information-inserting unit that inserts position information in the video-stream layer, the position information showing arrangement positions of the plurality of images.

(2) The transmission device according to (1), in which the information-inserting unit further inserts offset information in the video-stream layer, the offset information being used to adjust display timing of the plurality of images.

(3) The transmission device according to (1) or (2), in which the information-inserting unit further inserts type information in the video-stream layer, the type information showing the multi-image-arrangement type.

(4) The transmission device according to any one of (1) to (3), in which the information-inserting unit further inserts type information in the video-stream layer, the type information showing a rotation type of the plurality, of images during display.

(5) The transmission device according to any one of (1) to (4), in which the information-inserting unit further inserts lifetime information in the video-stream layer, the lifetime information showing display-allowed time of the plurality of images is controlled or not.

(6) The transmission device according to any one of (1) to (5), in which the information-inserting unit further inserts identification information in the container layer, the identification information identifying the multi-image-arrangement distribution service.

(7) The transmission device according to (6), in which the information-inserting unit further inserts identification information in the container layer, the identification information identifying if the multi-image-arrangement distribution service is a moving/still-image mixed service or not.

(8) The transmission device according to any one of (1) to (7), in which the information-inserting unit further inserts information on a total number of the video streams relating to the multi-image-arrangement distribution service in the container layer.

(9) The transmission device according to any one of (1) to (8), in which the information-inserting unit further inserts type information in the container layer, the type information showing if the each video stream is a moving-image stream, a still-image stream, or a mixed stream, the mixed stream containing still images and moving images mixed.

(10) A transmission method, including:

a transmitting step of transmitting a container of a predetermined format containing a predetermined number of video streams containing encoded data of a plurality of images of a multi-image-arrangement distribution service; and an information inserting step of inserting position information in the video-stream layer, the position information showing arrangement positions of the plurality of images.

(11) A receiving device, including:

a receiving unit that receives a predetermined number of video streams containing encoded image data of a plurality of images of a multi-image-arrangement distribution service, position information being inserted in the predetermined number of video streams, the position information showing arrangement positions of the plurality of images;

a decoder unit that decodes the predetermined number of video streams, and obtains image data of the plurality of images; and a processing unit that arranges image data of the plurality of decoded images based on the position information, and obtains image data of a multi-image-arranged image.

(12) The receiving device according to (11), further including:

a decoded buffer that temporarily stores the image data of the plurality of images obtained by the decoder unit; and a virtual display buffer that temporarily stores the image data of the multi-image arrangement, in which the processing unit reads the image data of the plurality of images from the decoded buffer in series, and writes the image data of the plurality of images in areas corresponding to the arrangement positions of the position information of the virtual display buffer.

(13) The receiving device according to (2), further including:
a display controller that reads image data corresponding to part or all of display areas of the multi-image-arranged image from the virtual display buffer, and displays images in the part or all of image areas.

(14) The receiving device according to (13), further including:
a user operation unit that informs the display controller of the display area.

(15) The receiving device according to (14), further including:
a user operation unit that informs the display controller of the number of displays, images of the display area being to be displayed on the displays.

(16) The receiving device according to any one of (11) to (15), further including:
a request transmitting unit that transmits, to a transmitting side, requests to stop and resume transmission of the predetermined number of video streams.

(17) A receiving method, including:
a receiving step of receiving a container of a predetermined format containing a predetermined number of video streams containing encoded data of a plurality of images of a multi-image-arrangement distribution service, position information being inserted in the predetermined number of video streams, the position information showing arrangement positions of the plurality of images;
a decoding step of decoding the predetermined number of video streams, and obtaining image data of the plurality of images; and
a processing step of arranging image data of the plurality of decoded images based on the position in-formation, and obtaining image data of a multi-image-arranged image.

(18) A transmission device, including:
a metafile generator that generates a metafile containing information to be used by a client terminal to obtain a predetermined number of video streams, the predetermined number of video streams containing encoded image data of a plurality of images of a multi-image-arrangement distribution service, a distribution server being capable of distributing the multi-image-arrangement distribution service via a network; and
a metafile transmitting unit that transmits the generated metafile to the client terminal via the network in response to a transmission request from the client terminal, in which
position information is inserted in the video-stream layer, the position information showing arrangement positions of the plurality of images, and
the metafile generator generates the metafile containing information showing to constantly read the predetermined number of video streams.

(19) The transmission device according to (18), in which
the metafile generator generates the metafile further containing identification information, the identification information identifying if the predetermined number of video streams are still-image streams or moving-image streams.

According to the main features of the present technology, when transmitting, via an RP transmission path or a communication network, a container of a predetermined format containing a predetermined number of video streams containing encoded image data of a plurality of images of a multi-image-arrangement distribution service, position information (location_id) showing arrangement positions of a plurality of images is inserted in a video-stream layer. As a result, for example, the receiving side is capable of arranging a plurality of images in a group picture (multi-image-arranged image) effectively and appropriately (see FIG. 18).

DESCRIPTION OF SYMBOLS 10, 10A distribution system
11 DASH segment streamer
12 DASH MPD server
13, 13-1 to 13-N IPTV client
14 CDN
15 content management server
110 broadcast station
112 moving/still-image output unit
113 video encoder
114 multiplexer
200 receiver
201 tuner
202 demultiplexer
203 compressed data buffer
204 decoder
205 uncompressed data buffer
206 virtual display buffer
207 scaler
208 display
209 gateway/network router
210 CPU
211 user operation unit
212 storage medium

The invention claimed is:
1. A receiving device, comprising:
circuitry configured to:
receive a container including a plurality of video streams, each one of the video streams including encoded data of a plurality of images and a corresponding piece of group picture information, and each piece of group picture information included in a corresponding video stream of the video streams including a respective group picture identifier and respective location information,
the respective group picture identifier identifying a group picture that is formed according to the video streams, and
the respective location information indicating an arrangement position in the group picture for arranging respective images from the corresponding video stream into the group picture;
extract the video streams and the pieces of group picture information included in the container;
decode the encoded data of each of the video streams to obtain a respective piece of decoded image data of the each of the video streams; and
arrange the pieces of decoded image data of the video streams into the group picture according to the piece of the group picture information of each of the video streams.

2. The receiving device according to claim 1, further comprising:
a decoded buffer that temporarily stores the pieces of decoded image data of the video streams; and
a virtual display buffer that temporarily stores image data of the group picture, wherein
the circuitry is configured to store the image data of the group picture by reading the respective piece of decoded image data of each of the video streams from the decoded buffer in series, and writing the respective piece of decoded image data in an area of the virtual display buffer according to the location information included in the video streams.

3. The receiving device according to claim 2, wherein the circuitry is further configure to:
read the image data, corresponding to part or all of the group picture from the virtual display buffer, and display the part or all of the group picture.

4. The receiving device according to claim 3, wherein the circuitry is further configure to
receive a user input to display the group picture.

5. The receiving device according to claim 3, wherein the circuitry is further configure to:
receive a user input to display the part of the group picture.

6. The receiving device according to claim 1, wherein the circuitry is further configure to:
transmit a request to a transmitting device to stop and resume transmission of the container.

7. The receiving device according to claim 1, wherein the container has a format of one of a Moving Picture Experts Group (MPEG) transport stream format, MPEG media transport format, and MP4 file format.

8. The receiving device according to claim 1, wherein the pieces of decoded image data of the video streams in the group picture are arranged one-dimensionally or two-dimensionally.

9. The receiving device according to claim 1, wherein the respective location information, included in the corresponding piece of group picture information in one of the video streams, includes:
a picture rendering type identifier indicating a type of arrangement of the images in the group picture, and
a location identifier indicating the arrangement position among spatial positions determined according to the type of arrangement indicated by the picture rendering type identifier.

10. A receiving method, comprising:
receiving a container including a plurality of video streams, each one of the video streams including encoded data of a plurality of images and a corresponding piece of group picture information, and each piece of group picture information included in a corresponding video stream of the video streams including a respective group picture identifier and respective location information,
the respective group picture identifier identifying a group picture that is formed according to the video streams, and
the respective location information indicating an arrangement position in the group picture for arranging respective images from the corresponding video stream into the group picture;
extracting the video streams and the pieces of group picture information included in the container;
decoding the encoded data of each of the video streams to obtain a respective piece of decoded image data of the each of the video streams; and
arranging the pieces of decoded image data of the video streams into the group picture according to the piece of the group picture information of each of the video streams.

11. The receiving method according to claim 10, further comprising:
temporarily storing the pieces of decoded image data of the video streams in a decoded buffer; and
temporarily storing image data of the group picture in a virtual display buffer, including
reading the respective piece of decoded image data of each of the video streams from the decoded buffer in series, and
writing the respective piece of decoded image data in an area of the virtual display buffer according to the location information included in the video streams.

12. The receiving method according to claim 11, further comprising:
reading the image data corresponding to part or all of the group picture from the virtual display buffer, and displaying the part or all of the group picture.

13. The receiving method according to claim 12, further comprising:
receiving a user input to display the group picture.

14. The receiving method according to claim 12, further comprising:
receiving a user input to display the part of the group picture.

15. The receiving method according to claim 10, further comprising:
transmitting a request to a transmitting device to stop and resume transmission of the container.

16. The receiving method according to claim 10, wherein the container has a format of one of a Moving Picture Experts Group (MPEG) transport stream format, MPEG media transport format, and MP4 file format.

17. The receiving method according to claim 10, wherein the pieces of decoded image data of the video streams in the group picture are arranged one-dimensionally or two-dimensionally.

18. A non-transitory computer-readable medium storing instructions which when executed by a computer cause the computer to perform a method, the method comprising:
receiving a container including a plurality of video streams, each one of the video streams including encoded data of a plurality of images and a corresponding piece of group picture information, and each piece of group picture information included in a corresponding video stream of the video streams including a respective group picture identifier and respective location information,
the respective group picture identifier identifying a group picture that is formed according to the video streams, and
the respective location information indicating an arrangement position in the group picture for arranging respective images from the corresponding video stream into the group picture;
extracting the video streams and the pieces of group picture information included in the container;
decoding the encoded data of each of the video streams to obtain a respective piece of decoded image data of the each of the video streams; and
arranging the pieces of decoded image data of the video streams into the group picture according to the piece of the group picture information of each of the video streams.

19. The non-transitory computer-readable medium according to claim 18, wherein the container has a format of one of a Moving Picture Experts Group (MPEG) transport stream format, MPEG media transport format, and MP4 file format.

20. The non-transitory computer-readable medium according to claim 18, wherein the pieces of decoded image data of the video streams in the group picture is arranged one-dimensionally or two-dimensionally.

21. The non-transitory computer-readable medium according to claim 18, wherein the method further comprises:
- temporarily storing the pieces of decoded image data of the video streams in a decoded buffer; and
- temporarily storing image data of the group picture in a virtual display buffer, including
  - reading the respective piece of decoded image data of each of the video streams from the decoded buffer in series, and
  - writing the respective piece of decoded image data in an area of the virtual display buffer according to the location information included in the video streams.

* * * * *